United States Patent
Kim et al.

(10) Patent No.: US 12,464,513 B2
(45) Date of Patent: Nov. 4, 2025

(54) METHOD AND DEVICE FOR PERFORMING POSITIONING BY MEANS OF BEAMFORMED SIGNAL IN WIRELESS COMMUNICATION SYSTEM

(71) Applicant: LG ELECTRONICS INC., Seoul (KR)

(72) Inventors: Byounggill Kim, Seoul (KR); Young Dae Kim, Seoul (KR); Chang Soo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 451 days.

(21) Appl. No.: 17/906,789

(22) PCT Filed: Apr. 13, 2021

(86) PCT No.: PCT/KR2021/004661
§ 371 (c)(1),
(2) Date: Feb. 13, 2023

(87) PCT Pub. No.: WO2021/221352
PCT Pub. Date: Nov. 4, 2021

(65) Prior Publication Data
US 2023/0254838 A1    Aug. 10, 2023

(30) Foreign Application Priority Data

Apr. 27, 2020  (KR) .................. 10-2020-0050502

(51) Int. Cl.
*H04W 72/12*    (2023.01)
*H04W 64/00*    (2009.01)

(52) U.S. Cl.
CPC ........... *H04W 72/12* (2013.01); *H04W 64/00* (2013.01)

(58) Field of Classification Search
CPC ....... H04W 72/12; H04W 64/00; H04W 4/40; H04W 24/10; H04B 7/06952; H04B 7/0617; H04L 1/08; H04L 5/00
See application file for complete search history.

(56) References Cited

U.S. PATENT DOCUMENTS 11,442,135 B2 *  9/2022  Akkarakaran ........ H04W 84/06
11,576,008 B2 *  2/2023  Priyanto ............... H04L 5/0048
(Continued)

FOREIGN PATENT DOCUMENTS

CN    109314945    2/2019
CN    109588059    4/2019
(Continued)

OTHER PUBLICATIONS

The State Intellectual Property Office of the People's Republic of China Application Serial No. 202180029871.4, Notice of Allowance dated Apr. 21, 2024, 10 pages.
(Continued)

*Primary Examiner* — Abdullahi Ahmed
(74) *Attorney, Agent, or Firm* — LEE, HONG, DEGERMAN, KANG & WAIMEY

(57) ABSTRACT

The present disclosure is for performing positioning by means of a beamformed signal in a wireless communication system. An operation method by a terminal in a wireless communication system can comprise the steps of: transmitting first messages requesting transmission of a positioning reference signal (PRS) by means of a plurality of transmission beams; receiving from a second terminal a second message indicating at least one transmission beam among the plurality of transmission beams; transmitting a third message, comprising scheduling information for transmission of the PRS, to the second terminal by means of the
(Continued)

transmission beam; and receiving the PRS from the second terminal on the basis of the scheduling information.

19 Claims, 24 Drawing Sheets

(56) References Cited

U.S. PATENT DOCUMENTS

| | | | |
|---|---|---|---|
| 2019/0380056 A1 | 12/2019 | Lee et al. | |
| 2020/0028648 A1* | 1/2020 | Akkarakaran | H04W 76/27 |
| 2022/0116996 A1* | 4/2022 | Lee | H04W 74/0816 |
| 2023/0198708 A1* | 6/2023 | Hong | H04L 5/0094 |
| | | | 370/329 |
| 2024/0365278 A1* | 10/2024 | Bao | H04L 27/261 |
| 2025/0142292 A1* | 5/2025 | Hoang | H04L 5/0094 |

FOREIGN PATENT DOCUMENTS

| | | |
|---|---|---|
| CN | 110999119 | 4/2020 |
| WO | 2016-013852 | 1/2016 |
| WO | 2018-159967 | 9/2018 |
| WO | 2019-036578 | 2/2019 |
| WO | 2019-232456 | 12/2019 |
| WO | 2020-050646 | 3/2020 |
| WO | 2020-068310 | 4/2020 |
| WO | 2020-069283 | 4/2020 |

OTHER PUBLICATIONS

ZTE, "Remaining issues on NR DL PRS," R1-1908307, 3GPP TSG RAN WG1 Meeting #98, Aug. 2019, 13 pages.
PCT International Application No. PCT/KR2021/004661, International Search Report dated Jul. 21, 2021, 4 page.

* cited by examiner

METHOD AND DEVICE FOR PERFORMING POSITIONING BY MEANS OF BEAMFORMED SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2021/004661, filed on Apr. 13, 2021, which claims the benefit of earlier filing date and right of priority to Korean Application No. 10-2020-0050502, filed on Apr. 27, 2020, the contents of which are all hereby incorporated by reference herein in their entireties.

TECHNICAL FIELD

The present disclosure relates to a wireless communication system and, more particularly, to a method and device for performing positioning using a beamformed signal in a wireless communication system.

BACKGROUND ART

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

DISCLOSURE

Technical Problem

The present disclosure relates to a method and device for efficiently performing positioning in a wireless communication system.

The present disclosure relates to a method and device for performing positioning using a beamformed signal in a wireless communication system.

The present disclosure relates to a method and device for reducing a time required for positioning in a wireless communication system.

The present disclosure relates to a method and device for simultaneously performing beamforming management and positioning preparation procedures in a wireless communication system.

The technical objects to be achieved in the present disclosure are not limited to the above-mentioned technical objects, and other technical objects that are not mentioned may be considered by those skilled in the art through the embodiments described below.

Technical Solution

As an example of the present disclosure, a method of operating a first terminal in a wireless communication system may comprise transmitting first messages requesting to transmit a positioning reference signal (PRS) using a plurality of transmit beams, receiving, from a second terminal, a second message indicating at least one transmit beam among the plurality of transmit beams, transmitting, to the second terminal, a third message including scheduling information for transmission of the PRS using the transmit beam, and receiving, from the second terminal, the PRS based on the scheduling information.

As an example of the present disclosure, a method of operating a second terminal in a wireless communication system may comprise receiving at least one of first messages requesting to transmit a positioning reference signal (PRS) transmitted by a first terminal using a plurality of transmit beams, transmitting, to the first terminal, a second message indicating at least one transmit beam among the plurality of transmit beams, receiving a third message including scheduling information for transmission of the PRS transmitted by the first terminal using the at least one transmit beam, and transmitting, to the first terminal, the PRS based on the scheduling information.

As an example of the present disclosure, a first terminal in a wireless communication system may comprise a transceiver and a processor connected to the transceiver. The processor may perform control to transmit first messages requesting to transmit a positioning reference signal (PRS) using a plurality of transmit beams, to receive, from a second terminal, a second message indicating at least one transmit beam among the plurality of transmit beams, to transmit, to the second terminal, a third message including scheduling information for transmission of the PRS using the transmit beam, and to receive, from the second terminal, the PRS based on the scheduling information.

As an example of the present disclosure, a second terminal in a wireless communication system may comprise a transceiver and a processor connected to the transceiver. The processor may perform control to receive at least one of first messages requesting to transmit a positioning reference signal (PRS) transmitted by a first terminal using a plurality of transmit beams, to transmit, to the first terminal, a second message indicating at least one transmit beam among the plurality of transmit beams, to receive a third message including scheduling information for transmission of the PRS transmitted by the first terminal using the at least one transmit beam and to transmit, to the first terminal, the PRS based on the scheduling information.

As an example of the present disclosure, a first device may comprise at least one memory and at least one processor functionally connected to the at least one memory. The at least one processor may control the first device to transmit first messages requesting to transmit a positioning reference signal (PRS) using a plurality of transmit beams, to receive, from a second terminal, a second message indicating at least one transmit beam among the plurality of transmit beams, to transmit, to the second terminal, a third message including scheduling information for transmission of the PRS using the transmit beam and to receive, from the second terminal, the PRS based on the scheduling information.

As an example of the present disclosure, a non-transitory computer-readable medium storing at least one instruction may comprise the at least one instruction executable by a processor. The at least one instruction instructs a first device to transmit first messages requesting to transmit a positioning reference signal (PRS) using a plurality of transmit beams, to receive, from a second device, a second message indicating at least one transmit beam among the plurality of transmit beams, to transmit, to the second device, a third message including scheduling information for transmission of the PRS using the transmit beam and to receive, from the second device, the PRS based on the scheduling information.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

As is apparent from the above description, the embodiments of the present disclosure have the following effects.

According to the present disclosure, positioning may be efficiently performed in a wireless communication system.

In addition, according to the present disclosure, when a positioning reference signal (PRS) transmission request and scheduling procedure and a beam management procedure are separately performed in a millimeter wave (mm Wave) band, a time required to request and receive the PRS may be further reduced.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

MODE FOR INVENTION

Figure 1:
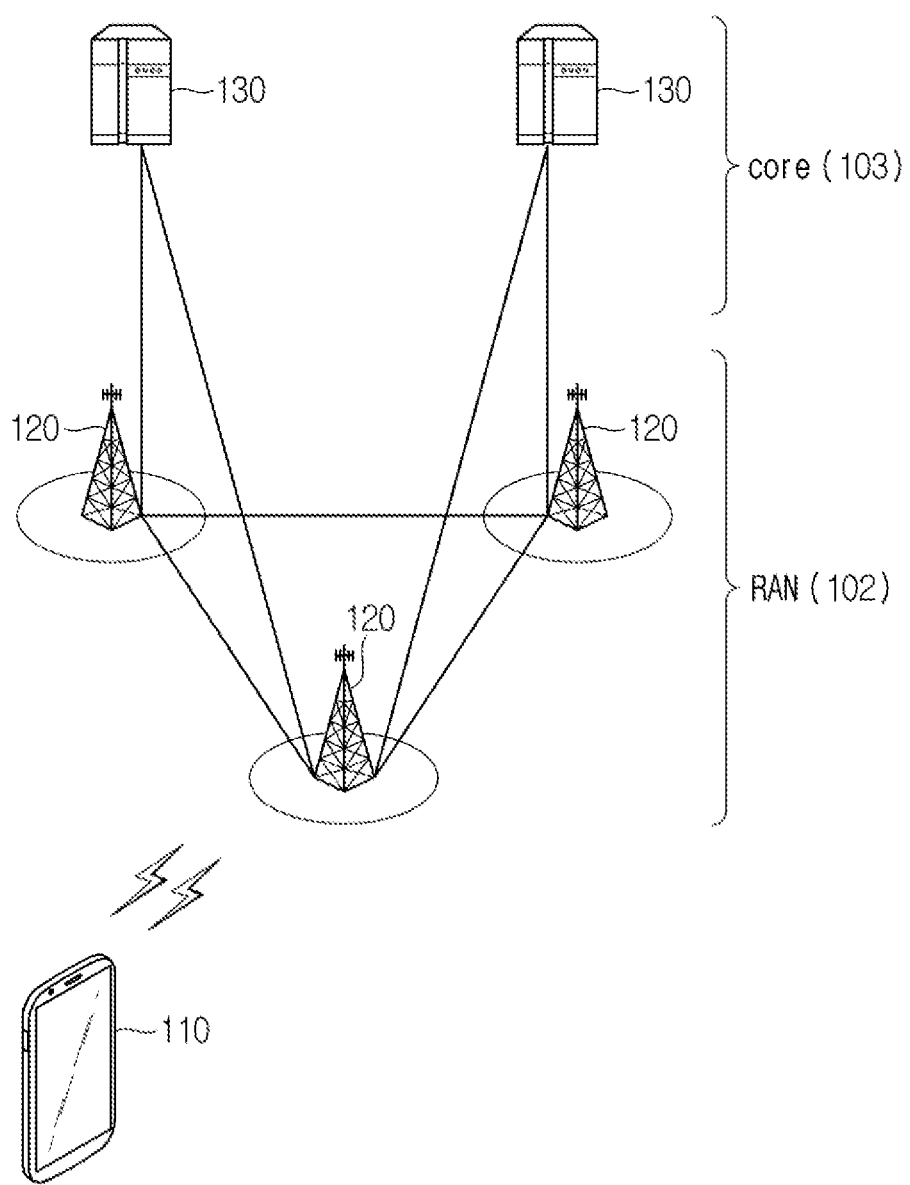
FIG. 1 illustrates a structure of a wireless communication system, in accordance with an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE
   3GPP TS 36.211: Physical channels and modulation
   3GPP TS 36.212: Multiplexing and channel coding
   3GPP TS 36.213: Physical layer procedures
   3GPP TS 36.214: Physical layer; Measurements
   3GPP TS 36.300: Overall description
   3GPP TS 36.304: User Equipment (UE) procedures in idle mode
   3GPP TS 36.314: Layer 2-Measurements
   3GPP TS 36.321: Medium Access Control (MAC) protocol
   3GPP TS 36.322: Radio Link Control (RLC) protocol
   3GPP TS 36.323: Packet Data Convergence Protocol (PDCP)
   3GPP TS 36.331: Radio Resource Control (RRC) protocol (2) 3GPP NR (e.g. 5G)
   3GPP TS 38.211: Physical channels and modulation
   3GPP TS 38.212: Multiplexing and channel coding
   3GPP TS 38.213: Physical layer procedures for control
   3GPP TS 38.214: Physical layer procedures for data
   3GPP TS 38.215: Physical layer measurements
   3GPP TS 38.300: Overall description
   3GPP TS 38.304: User Equipment (UE) procedures in idle mode and in RRC inactive state
   3GPP TS 38.321: Medium Access Control (MAC) protocol
   3GPP TS 38.322: Radio Link Control (RLC) protocol
   3GPP TS 38.323: Packet Data Convergence Protocol (PDCP)
   3GPP TS 38.331: Radio Resource Control (RRC) protocol
   3GPP TS 37.324: Service Data Adaptation Protocol (SDAP)
   3GPP TS 37.340: Multi-connectivity; Overall description Communication System Applicable to the Present Disclosure FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
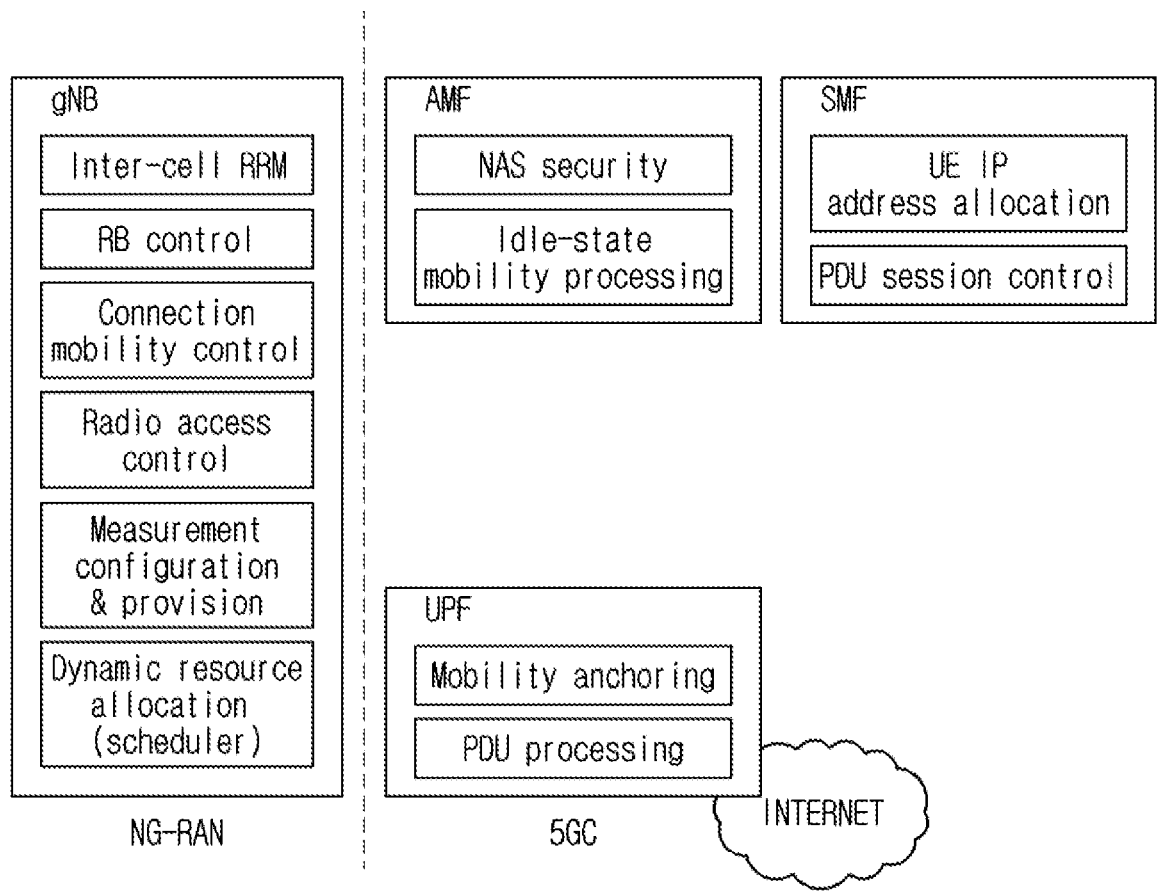
FIG. 2 illustrates a functional division between an NG-RAN and a SGC, in accordance with an embodiment of the present disclosure.

FIG. 2 illustrates a functional division between an NG-RAN and a 5GC, in accordance with an embodiment of the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

Figure 3A:
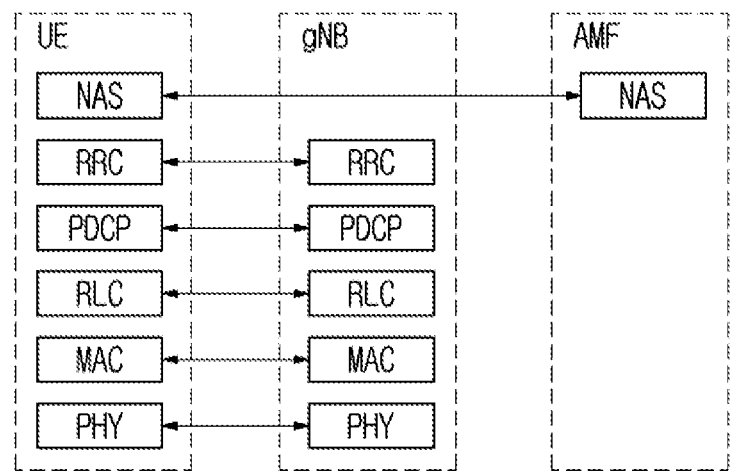
FIG. 3 illustrates a radio protocol architecture, in accordance with an embodiment of the present disclosure.
Figure 3B:
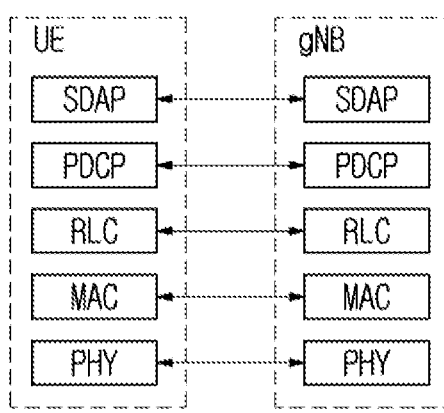

FIGS. 3A and 3B illustrate a radio protocol architecture, in accordance with an embodiment of the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Referring to FIGS. 3A and 3B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PI-TY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Radio Resource Structure

Figure 4:
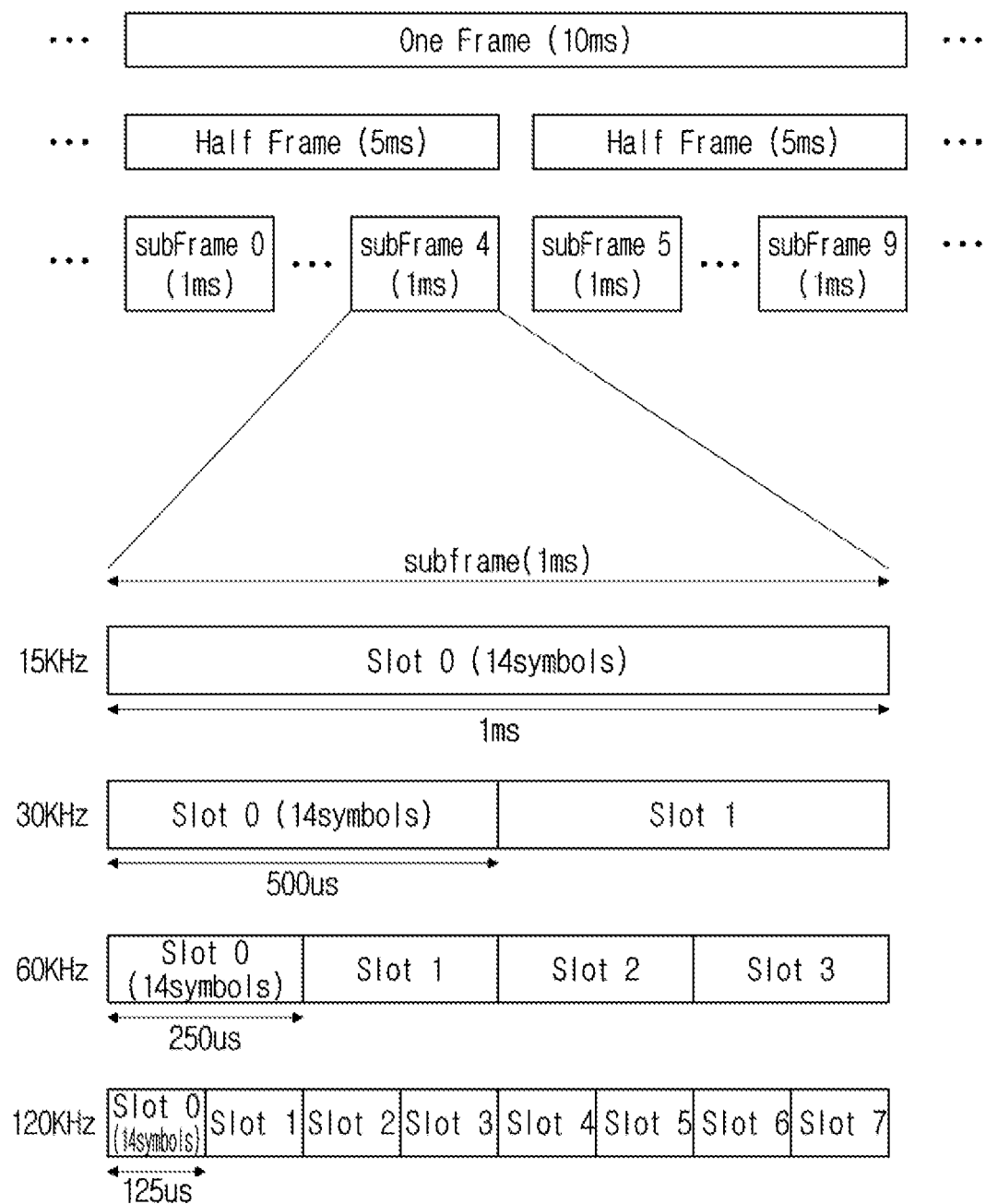
FIG. 4 illustrates a structure of a radio frame in an NR system, in accordance with an embodiment of the present disclosure.

FIG. 4 illustrates a structure of a radio frame in an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In a case where a normal CP is used, a number of symbols per slot ($N^{slot}_{symb}$), a number slots per frame ($N^{frame,\mu}_{slot}$), and a number of slots per subframe ($N^{subframe,\mu}_{slot}$) may be varied based on an SCS configuration ($\mu$). For instance, SCS(=15*$2^\mu$), $N^{slot}_{symb}$, $N^{frame,\mu}_{slot}$ and $N^{subframe,\mu}_{slot}$ are 15 KHz, 14, 10 and 1, respectively, when $\mu$=0, are 30 KHz, 14, 20 and 2, respectively, when $\mu$=1, are 60 KHz, 14, 40 and 4, respectively, when $\mu$=2, are 120 KHz, 14, 80 and 8, respectively, when $\mu$=3, or are 240 KHz, 14, 160 and 16, respectively, when μ=4. Meanwhile, in a case where an extended CP is used, SCS(=15*2^μ), $N^{slot}_{symb}$, $N^{frame,\mu}$ and $N^{subframe,\mu}$ are 60 KHz, 12, 40 and 2, respectively, when μ=2.

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, frequency ranges corresponding to the FR1 and FR2 may be 450 MHz-6000 MHz and 24250 MHz-52600 MHz, respectively. Further, supportable SCSs is 15, 30 and 60 kHz for the FR1 and 60, 120, 240 kHz for the FR2. Among the frequency ranges that are used in an NR system, FR1 may mean a "sub 6 GHz range", and FR2 may mean an "above 6 GHz range" and may also be referred to as a millimeter wave (mmW).

As described above, the values of the frequency ranges in the NR system may be changed (or varied). For example, comparing to examples for the frequency ranges described above, FR1 may be defined to include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

Figure 5:
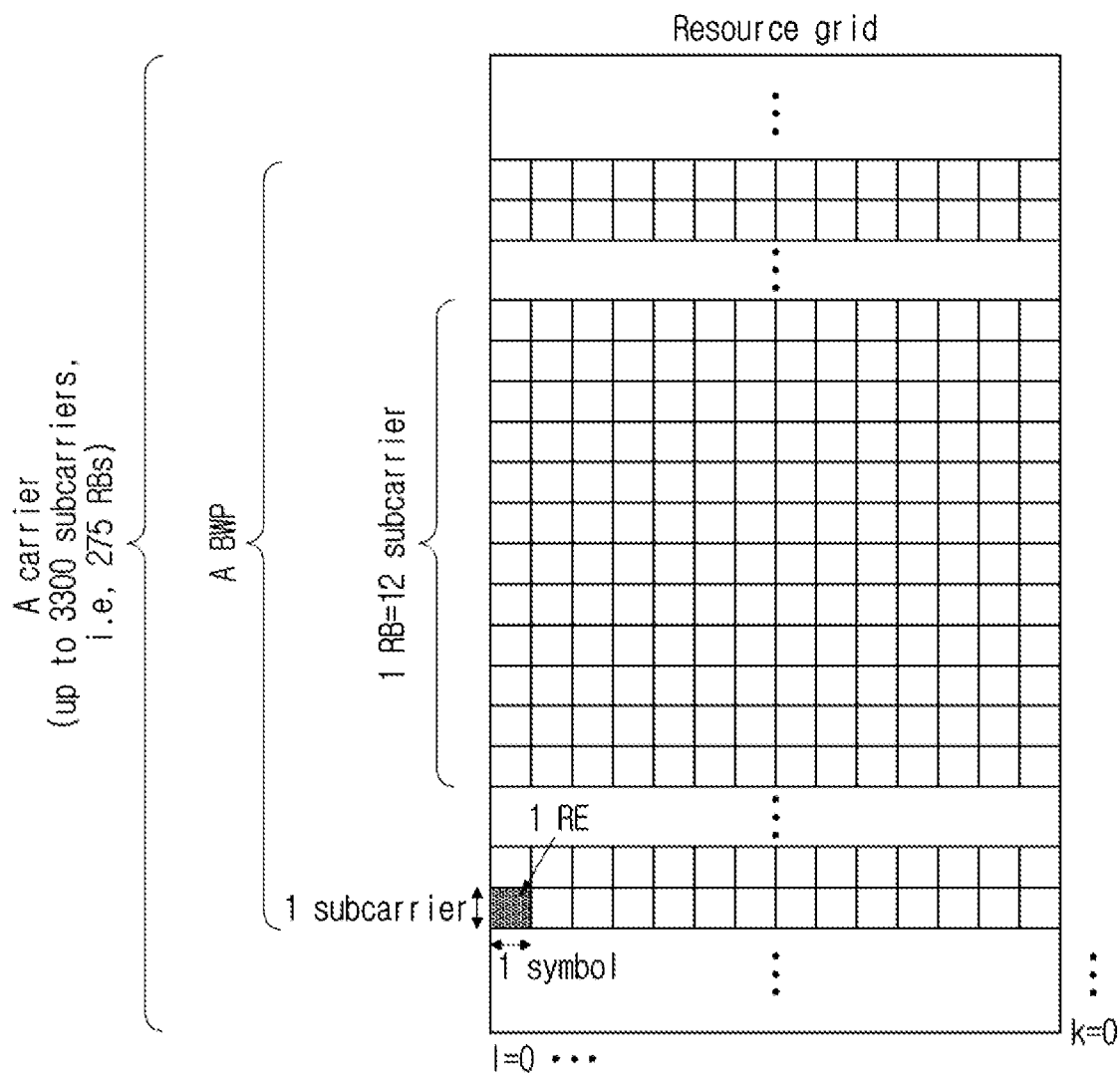
FIG. 5 illustrates a structure of a slot in an NR frame, in accordance with an embodiment of the present disclosure.

FIG. 5 illustrates a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Bandwidth Part (BWP)

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit a Physical Uplink Control Channel (PUCCH) or a Physical Uplink Shared Channel (PUSCH) outside an active UL BWP. For example, in a downlink case, the initial BWP may be given as a consecutive RB set for a remaining minimum system information (RMSI) control resource set (CORESET) (configured by PBCH). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

Figure 6:
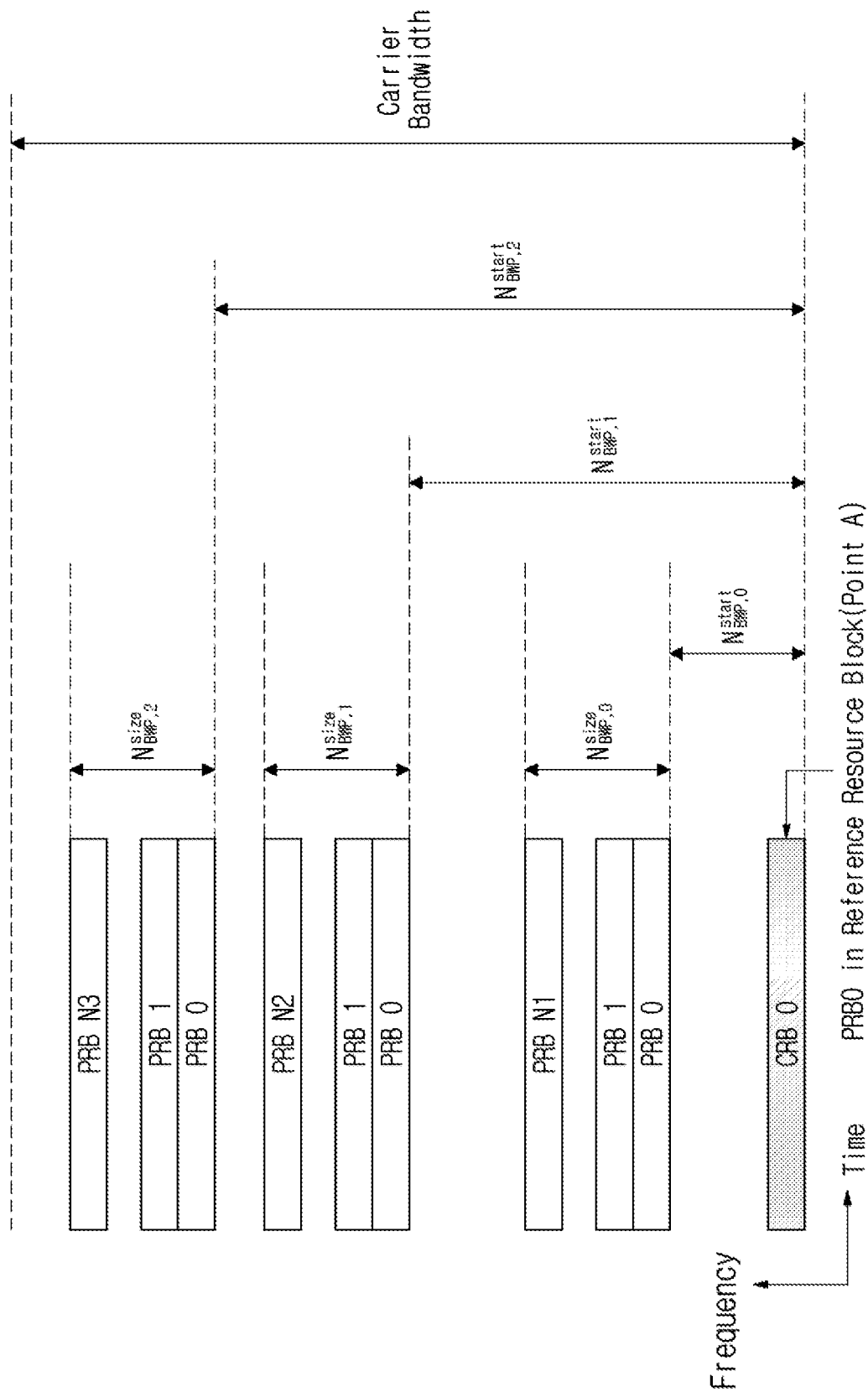
FIG. 6 illustrates an example of a BWP, in accordance with an embodiment of the present disclosure.

FIG. 6 illustrates an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset ($N^{start}_{BWP}$) from the point A, and a bandwidth ($N^{size}_{BWP}$). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 7A:
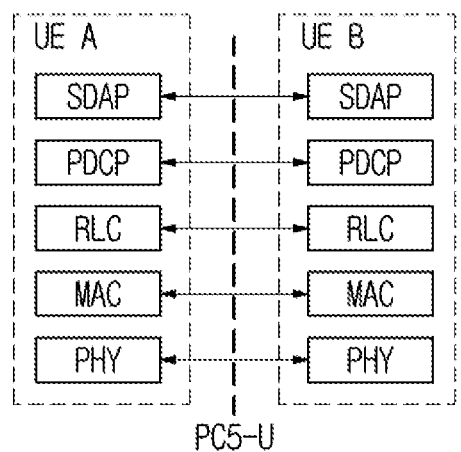
FIGS. 7A and 7B illustrate a radio protocol architecture for a SL communication, in accordance with an embodiment of the present disclosure.
Figure 7B:
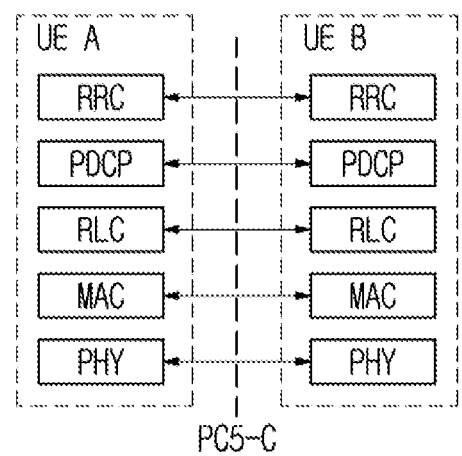

FIGS. 7A and 7B illustrate a radio protocol architecture for a SL communication, in accordance with an embodiment of the present disclosure. The embodiment of FIGS. 7A and 7B may be combined with various embodiments of the present disclosure. More specifically, FIG. 7A exemplifies a user plane protocol stack, and FIG. 7B exemplifies a control plane protocol stack.

Sidelink Synchronization Signal (SLSS) and Synchronization Informaion

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

For example, based on Table 1, the UE may generate an S-SS/PSBCH block (i.e., S-SSB), and the UE may transmit the S-SS/PSBCH block (i.e., S-SSB) by mapping it on a physical resource.

TABLE 1

| Time-frequency structure of an S-SS/PSBCH block |
| --- |
| In the time domain, an S-SS/PSBCH block consists of $N^{S-SSB}_{symb}$ OFDM symbols, numbered in increasing order from 0 to $N^{S-SSB}_{symb} - 1$ within the S-SS/PSBCH block, where S-PSS, S-SSS, and PSBCH with associated DM-RS are mapped to symbols as given by Table 8.4.3.1-1. The number of OFDM symbols in an S-SS/PSBCH block $N^{S-SSB}_{symb} = 13$ for normal cyclic prefix and $N^{S-SSB}_{symb} = 11$ for extended cyclic prefix. The first OFDM symbol in an S-SS/PSBCH block is the first OFDM symbol in the slot. In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block. For an S-SS/PSBCH block, the UE shall use<br>    antenna port 4000 for transmission of S-PSS, S-SSS, PSBCH and DM-RS for PSBCH;<br>    the same cyclic prefix length and subcarrier spacing for the S-PSS, S-SSS, PSBCH and DM-RS for PSBCH, |

TABLE 1-continued

Time-frequency structure of an S-SS/PSBCH block

Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, ..., $N_{symb}^{S-SSB} - 1$ | 0, 1, . . . , 131 |
| DM-RS for PSBCH | 0, 5, 6, ..., $N_{symb}^{S-SSB} - 1$ | 0, 4, 8, . . . , 128 |

Synchronization Acquisition OF SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 8:
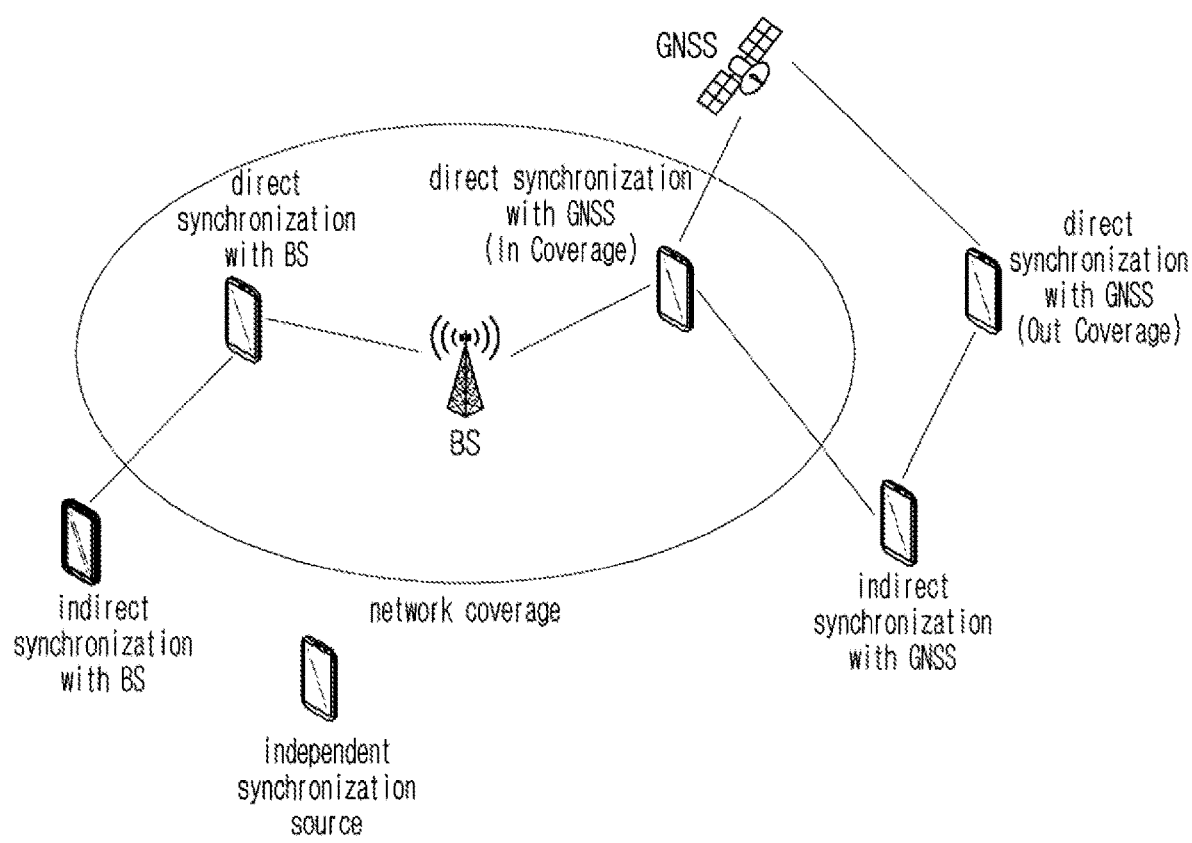
FIG. 8 illustrates a synchronization source or synchronization reference of V2X, in accordance with an embodiment of the present disclosure.

FIG. 8 illustrates a synchronization source or synchronization reference of V2X, in accordance with an embodiment of the present disclosure. The embodiment of FIG. 8 may be combined with various embodiments of the present disclosure.

Referring to FIG. 8, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre) determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE.

Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre) determined. In a single-carrier operation, the UE may derive its transmission timing from an available synchronization reference with the highest priority.

For example, the UE may (re) select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 9A:
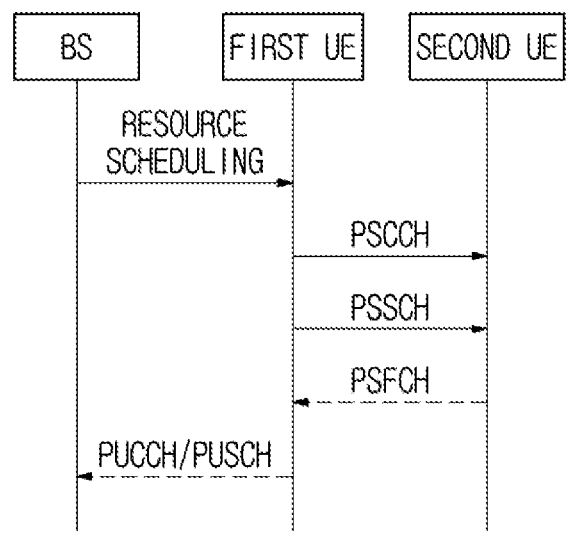
FIGS. 9A and 9B illustrate a procedure of performing V2X or SL communication by a terminal based on a transmission mode, in accordance with an embodiment of the present disclosure.
Figure 9B:
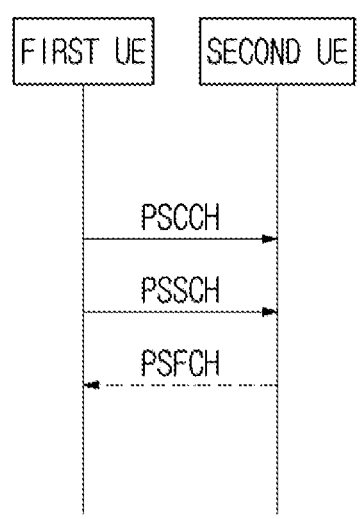

FIGS. 9A and 9B illustrate a procedure of performing V2X or SL communication by a terminal based on a transmission mode, in accordance with an embodiment of the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 9A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 9A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

Subsequently, the first UE may transmit a PSCCH (e.g., sidelink control information (SCI) or $1^{st}$-stage SCI) to a second UE based on the resource scheduling. After then, the first UE may transmit a PSSCH (e.g., $2^{nd}$-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

| 3GPP TS 38.212 |
|---|
| Format 3_0<br>DCI format 3_0 is used for scheduling of NR PSCCH and NR PSSCH in one cell.<br>The following information is transmitted by means of the DCI format 3_0 with CRC scrambled by SL-RNTI or SL-CS-RNTI:<br>    Resource pool index -[log2 I] bits, where I is the number of resource pools for transmission configured by the higher layer parameter sl-TxPoolScheduling.<br>    Time gap - 3 bits determined by higher layer parameter sl-DCI-ToSL-Trans, as defined in clause 8.1.2.1 of [6, TS 38.214]<br>    HARQ process number - 4 bits as defined in clause 16.4 of [5, TS 38.213].<br>    New data indicator - 1 bit as defined in clause 16.4 of [5, TS 38.213].<br>    Lowest index of the subchannel allocation to the initial transmission -<br>    $\lceil \log_2(N^{SL}_{subChannel}) \rceil$ bits as defined in clause 8.1.2.2 of [6, TS 38.214]<br>    SCI format 1-A fields according to clause 8.3.1.1:<br>        Frequency resource assignment.<br>        Time resource assignment.<br>        PSFCH-to-HARQ feedback timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]<br>        PUCCH resource indicator - 3 bits as defined in clause 16.5 of [5, TS 38.213].<br>        Configuration index - 0 bit if the UE is not configured to monitor DCI format 3_0 with CRC scrambled by SL-CS-RNTI; otherwise 3 bits as defined in |

TABLE 4-continued

3GPP TS 38.212 clause 8.1.2 of [6, TS 38.214]. If the UE is configured to monitor DCI format
3_0 with CRC scrambled by SL-CS-RNTI, this field is reserved for DCI
format 3_0 with CRC scrambled by SL-RNTI.
Counter sidelink assignment index - 2 bits
   2 bits as defined in clause 16.5.2 of [5, TS 38.213] if the UE is configured
   with pdsch-HARQ-ACK-Codebook = dynamic
   2 bits as defined in clause 16.5.1 of [5, TS 38.213] if the UE is configured
   with pdsch-HARQ-ACK-Codebook = semi-static
Padding bits, if required
Format 3_1
DCI format 3_1 is used for scheduling of LTE PSCCH and LTE PSSCH in one cell.
The following information is transmitted by means of the DCI format 3_1 with CRC
scrambled by SL-L-CS-RNTI:
   Timing offset - 3 bits determined by higher layer parameter sl-
   TimeOffsetEUTRA, as defined in clause 16.6 of [5, TS 38.213]
   Carrier indicator -3 bits as defined in 5.3.3.1.9A of [11, TS 36.212].
   Lowest index of the subchannel allocation to the initial transmission -
   $\lceil \log_2(N_{subChannel}^{SL}) \rceil$ bits as defined in 5.3.3.1.9A of [11, TS 36.212].
   Frequency resource location of initial transmission and retransmission, as
   defined in 5.3.3.1.9A of [11, TS 36.212]
   Time gap between initial transmission and retransmission, as defined in
   5.3.3.1.9A of [11, TS 36.212]
   SL index - 2 bits as defined in 5.3.3.1.9A of [11, TS 36.212]
   SL SPS configuration index - 3 bits as defined in clause 5.3.3.1.9A of [11, TS
   36.212].
   Activation/release indication - 1 bit as defined in clause 5.3.3.1.9A of [11, TS
   36.212].

Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re) selection procedure. For example, the sensing may be performed in unit of subchannel(s). For example, subsequently, a first UE which has selected resource(s) from a resource pool by itself may transmit a PSCCH (e.g., sidelink control information (SCI) or $1^{st}$-stage SCI) to a second UE by using the resource(s). After then, the first UE may transmit a PSSCH (e.g., $2^{nd}$-stage SCI, MAC PDU, data, etc.) related to the PSCCH to the second UE. In step S8030, the first UE may receive a PSFCH related to the PSCCH/PSSCH from the second UE.

Referring to FIGS. 9A and 9B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Table 5 shows an example of a $1^{st}$-stage SCI format.

TABLE 5

3GPP TS 38.212

SCI format 1-A
SCI format 1-A is used for the scheduling of PSSCH and $2^{nd}$-stage-SCI on PSSCH
The following information is transmitted by means of the SCI format 1-A:
   Priority - 3 bits as specified in clause 5.4.3.3 of [12, TS 23.287] and clause
   5.22.1.3.1 of [8, TS 38.321].

Frequency resource assignment - $\left\lceil \log_2\left(\frac{N_{subChannel}^{SL}(N_{subChannel}^{SL}+1)}{2}\right) \right\rceil$ bits when the value of the higher layer parameter sl-MaxNumPerReserve is configured to 2;

otherwise $\left\lceil \log_2\left(\frac{N_{subChannel}^{SL}(N_{subChannel}^{SL}+1)(2N_{subChannel}^{SL}+1)}{6}\right) \right\rceil$ bits when the value of the higher layer parameter sl-MaxNumPerReserve is configured to 3, as
defined in clause 8.1.2.2 of [6, TS 38.214].

TABLE 5-continued

3GPP TS 38.212

Time resource assignment - 5 bits when the value of the higher layer
parameter sl-MaxNumPerReserve is configured to 2; otherwise 9 bits when
the value of the higher layer parameter sl-MaxNumPerReserve is configured
to 3, as defined in clause 8.1.2.1 of [6, TS 38.214].
Resource reservation period - $\lceil \log_2 N_{rsv\_period} \rceil$ bits as defined in clause 8.1.4
of [6, TS 38.214], where $N_{rsv\_period}$ is the number of entries in the higher
layer parameter sl-ResourceReservePeriodList, if higher layer parameter sl-
MultiReserveResource is configured; 0 bit otherwise.
DMRS pattern - $\lceil \log_2 N_{pattern} \rceil$ bits as defined in clause 8.4.1.1.2 of [4, TS
38.211], where $N_{pattern}$ is the number of DMRS patterns configured by
higher layer parameter sl-PSSCH-DMRS-TimePatternList.
$2^{nd}$-stage SCI format - 2 bits as defined in Table 8.3.1.1-1.
Beta offset indicator - 2 bits as provided by higher layer parameter sl-
BetaOffsets2ndSCI and Table 8.3.1.1-2.
Number of DMRS port - 1 bit as defined in Table 8.3.1.1-3.
Modulation and coding scheme - 5 bits as defined in clause 8.1.3 of [6, TS
38.214].
Additional MCS table indicator - as defined in clause 8.1.3.1 of [6, TS
38.214]: 1 bit if one MCS table is configured by higher layer parameter sl-
Additional-MCS-Table; 2 bits if two MCS tables are configured by higher
layer parameter sl-Additional-MCS-Table; 0 bit otherwise.
PSFCH overhead indication - 1 bit as defined clause 8.1.3.2 of [6, TS 38.214]
if higher layer parameter sl-PSFCH-Period = 2 or 4; 0 bit otherwise.
Reserved - a number of bits as determined by the higher layer parameter sl-
NumReservedBits, with value set to zero.

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Table 8.3.1.1-2: Mapping of Beta_offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 6 shows an example of a $2^{nd}$-stage SCI format.

TABLE 6

3GPP TS 38.212

SCI format 2-A

SCI format 2-A is used for the decoding of PSSCH, with HARQ operation when
HARQ-ACK information includes ACK or NACK, when HARQ-ACK information
includes only NACK, or when there is no feedback of HARQ-ACK information.
The following information is transmitted by means of the SCI format 2-A:
  HARQ process number - 4 bits as defined in clause 16.4 of [5, TS 38.213].
  New data indicator - 1 bit as defined in clause 16.4 of [5, TS 38.213].
  Redundancy version - 2 bits as defined in clause 16.4 of [6, TS 38.214].
  Source ID - 8 bits as defined in clause 8.1 of [6, TS 38.214].
  Destination ID - 16 bits as defined in clause 8.1 of [6, TS 38.214].
  HARQ feedback enabled/disabled indicator - 1 bit as defined in clause 16.3 of
  [5, TS 38.213].
  Cast type indicator - 2 bits as defined in Table 8.4.1.1-1.
  CSI request - 1 bit as defined in clause 8.2.1 of [6, TS 38.214].

TABLE 6-continued

| 3GPP TS 38.212 | |
|---|---|
| Table 8.4.1.1-1: Cast type indicator | |
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |
| SCI format 2-B | |

SCI format 2-B is used for the decoding of PSSCH, with HARQ operation when HARQ-ACK information includes only NACK, or when there is no feedback of HARQ-ACK information.
The following information is transmitted by means of the SCI format 2-B:
   HARQ process number - 4 bits as defined in clause 16.4 of [5, TS 38.213].
   New data indicator - 1 bit as defined in clause 16.4 of [5, TS 38.213].
   Redundancy version - 2 bits as defined in clause 16.4 of [6, TS 38.214].
   Source ID - 8 bits as defined in clause 8.1 of [6, TS 38.214].
   Destination ID - 16 bits as defined in clause 8.1 of [6, TS 38.214].
   HARQ feedback enabled/disabled indicator - 1 bit as defined in clause 16.3 of [5, TS 38.213].
   Zone ID - 12 bits as defined in clause 5.8.11 of [9, TS 38.331].
     Communication range requirement - 4 bits determined by higher layer parameter sl-ZoneConfigMCR-Index.

Referring to FIGS. 9A and 9B, the first UE may receive the PSFCH based on Table 7. For example, the first UE and the second UE may determine a PSFCH resource based on Table 7, and the second UE may transmit HARQ feedback to the first UE using the PSFCH resource.

TABLE 7

| 3GPP TS 38.213 |
|---|

UE procedure for reporting HARQ-ACK on sidelink
A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by sl-PSFCH-Period-r16, a number of slots in a resource pool for a period of PSFCH transmission occasion resources. If the number is zero, PSFCH transmissions from the UE in the resource pool are disabled.

A UE expects that a slot $t_k'^{SL}(0 \leq k < T_{max}')$ has a PSFCH transmission occasion resource if k mod $N_{PSSCH}^{PSFCH} = 0$, where $t_k'^{SL}$ is defined in [6, TS 38.214], and $T_{max}'$ is a number of slots that belong to the resource pool within 10240 msec according to [6, TS 38.214], and $N_{PSSCH}^{PSFCH}$ is provided by sl-PSFCH-Period-r16.

A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

TABLE 7-continued

3GPP TS 38.213

A UE is provided by sl-PSFCH-RB-Set-r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $\left[\left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subch,slot}^{PSFCH} - 1\right]$ PRBs from the $M_{PRB,set}^{PSFCH}$ PRBs to slot i amoung the PSSCH slots associated with the PSFCH slot and sub-channel j, where $e = M_{PRB,set}^{PSFCH}/\left(N_{subch} \cdot N_{PSSCH}^{PSFCH}\right)$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot e$.

A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{cs}^{PSFCH}$ where $N_{CS}^{PSFCH}$ is a number of cyclic shift pairs for the resource pool and, based on an indication by higher layers, $N_{type}^{PSFCH} = 1$ and the $M_{subch,slot}^{CSFCH}$ PRBs are associated with the starting sub-channel of the corresponding PSSCH $N_{type}^{PSFCH} = N_{subch}^{PSSCH}$ and the $N_{subch}^{PSSCH} \cdot M_{subch,slot}^{PSFCH}$ PRBs are associated with one or more sub-channels of the corresponding PSSCH.

The PSFCH resources are first indexed according to an ascending order of the PRB index, from the $N_{type}^{PSFCH} \cdot M_{subch,slot}^{PSFCH}$ PRBs and then according to an ascending order of the cyclic shift pair index from the $N_{CS}^{PSFCH}$ cyclic shift pairs.

A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift $\alpha$ [4, TS 38.211], from a cyclic shift pair index corresponding to a PSFCH resource index and from $N_{CS}^{PSFCH}$ using Table 16.3-1.

Table 16.3-1: Set of cyclic shift pairs

| $N_{CS}^{PSFCH}$ | $m_0$ | | | | | |
| --- | --- | --- | --- | --- | --- | --- |
| | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | | | | |
| 2 | 0 | 3 | 1 | | | |

TABLE 7-continued

| 3GPP TS 38.213 | | | | | | |
|---|---|---|---|---|---|---|
| 3 | 0 | 2 | 4 | | | |
| 6 | 0 | 1 | 2 | 3 | 4 | 5 |

A UE determins a $m_{cs}$ value, for computing a value of cyclic shift α [4, TS 38.211], as in Table 16.3-2 if the UE detects a SCI fromat 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to FIG. 9A, the first UE may transmit SL HARQ feedback to the base station through the PUCCH and/or the PUSCH based on Table 8.

TABLE 8

3GPP TS 38.213
16.5 UE procedure for reporting HARQ-ACK on uplink

A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.
For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources. For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.
For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable
  if the UE receives a PSFCH associated with a SCI format 2-A with Cast type indicator field value of "10"
    generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
  if the UE receives a PSFCH associated with a SCI format 2-A with Cast type indicator field value of "01"
    generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in clause 16.3; otherwise, generate NACK
  if the UE receives a PSFCH associated with a SCI format 2-B or a SCI format 2-A with Cast type indicator field value of "11"
    generate ACK when the UE determines absence of PSFCH reception for each PSFCH reception occasion from the number of PSFCH reception occasions; otherwise, generate NACK TABLE 8-continued 3GPP TS 38.213
16.5 UE procedure for reporting HARQ-ACK on uplink After a UE transmits PSSCHs and receives PSFCHs in corresponding PSFCH
resource occasions, the priority value of HARQ-ACK information is same as the
priority value of the PSSCH transmissions that is associated with the PSFCH
reception occasions providing the HARQ-ACK information.
The UE generates a NACK when, due to prioritization, as described in clause
16.2.4, the UE does not receive PSFCH in any PSFCH reception occasion
associated with a PSSCH transmission in a resource provided by a DCI format 3_0
with CRC scrambled by a SL-RNTI or, for a configured grant, in a resource
provided in a single period and for which the UE is provided a PUCCH resource to
report HARQ-ACK information. The priority value of the NACK is same as the
priority value of the PSSCH transmission.
The UE generates a NACK when, due to prioritization as described in clause 16.2.4,
the UE does not transmit a PSSCH in any of the resources provided by a DCI format
3_0 with CRC scrambled by a SL-RNTI or, for a configured grant, in any of the
resources provided in a single period and for which the UE is provided a PUCCH
resource to report HARQ-ACK information. The priority value of the NACK is
same as the priority value of the PSSCH that was not transmitted due to
prioritization.
The UE generates an ACK if the UE does not transmit a PSCCH with a SCI format
1-A scheduling a PSSCH in any of the resources provided by a configured grant in a
single period and for which the UE is provided a PUCCH resource to report HARQ-
ACK information. The priority value of the ACK is same as the largest priority
value among the possible priority values for the configured grant.
A UE does not expect to be provided PUCCH resources or PUSCH resources to
report HARQ-ACK information that start earlier than $(N + 1) \cdot (2048 + 144) \cdot \kappa \cdot 2^{\mu} \cdot T_c$ after the end of a last symbol of a last PSFCH reception occasion, from a
number of PSFCH reception occasions that the UE generates HARQ-ACK
information to report in a PUCCH or PUSCH transmission, where
   $\kappa$ and $T_c$ are defined in [4, TS 38.211]
   $\mu = \min(\mu_{SL}, \mu_{UL})$, where $\mu_{SL}$ is the SCS configuration of the SL BWP and
   $\mu_e$ is the SCS configuration of the active UL BWP on the primary cell
   N is determined from $\mu$ according to Table 16.5-1

Table 16.5-1: Values of N

| $\mu$ | N |
|---|---|
| 0 | 14 |
| 1 | 18 |
| 2 | 28 |
| 3 | 32 |

With reference to slots for PUCCH transmissions and for a number of PSFCH
reception occasions ending in slot n, the UE provides the generated HARQ-ACK
information in a PUCCH transmission within slot n + k, subject to the overlapping
conditions in clause 9.2.5, where k is a number of slots indicated by a PSFCH-to-
HARQ_feedback timing indicator field, if present, in a DCI format indicating a slot
for PUCCH transmission to report the HARQ-ACK information, or k is provided
by sl-PSFCH-ToPUCCH-CG-Type1-r16. k = 0 corresponds to a last slot for a
PUCCH transmission that would overlap with the last PSFCH reception occasion
assuming that the start of the sidelink frame is same as the start of the downlink
frame [4, TS 38.211].
For a PSSCH transmission by a UE that is scheduled by a DCI format, or for a SL
configured grant Type 2 PSSCH transmission activated by a DCI format, the DCI
format indicates to the UE that a PUCCH resource is not provided when a value of
the PUCCH resource indicator field is zero and a value of PSFCH-to-HARQ
feedback timing indicator field, if present, is zero. For a SL configured grant Type 1
PSSCH transmission, a PUCCH resource can be provided by sl-NIPUCCH-AN-r16
and sl-PSFCH-ToPUCCH-CG-Type-r16. If a PUCCH resource is not provided, the
UE does not transmit a PUCCH with generated HARQ-ACK information from
PSFCH reception occasions.
For a PUCCH transmission with HARQ-ACK information, a UE determines a
PUCCH resource after determining a set of PUCCH resources for $O_{UCI}$ HARQ-
ACK information bits, as described in clause 9.2.1. The PUCCH resource
determination is based on a PUCCH resource indicator field [5, TS 38.212] in a last
DCI format 3_0, among the DCI formats 3_0 that have a value of a PSFCH-to-
HARQ_feedback timing indicator field indicating a same slot for the PUCCH
transmission, that the UE detects and for which the UE transmits corresponding
HARQ-ACK information in the PUCCH where, for PUCCH resource
determination, detected DCI formats are indexed in an ascending order across
PDCCH monitoring occasion indexes.
A UE does not expect to multiplex HARQ-ACK information for more than one SL
configured grants in a same PUCCH.

TABLE 8-continued

3GPP TS 38.213
16.5 UE procedure for reporting HARQ-ACK on uplink

A priority value of a PUCCH transmission with one or more sidelink HARQ-ACK
information bits is the smallest priority value for the one or more HARQ-ACK
information bits.
In the following, the CRC for DCI format 3_0 is scrambled with a SI-RNTI or a SL-
CS-RNTI.

Figure 10A:
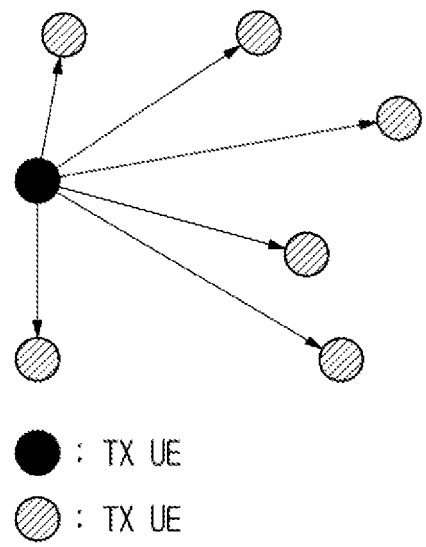
FIGS. 10A to 10C illustrate three cast types, in accordance with an embodiment of the present disclosure.
Figure 10B:
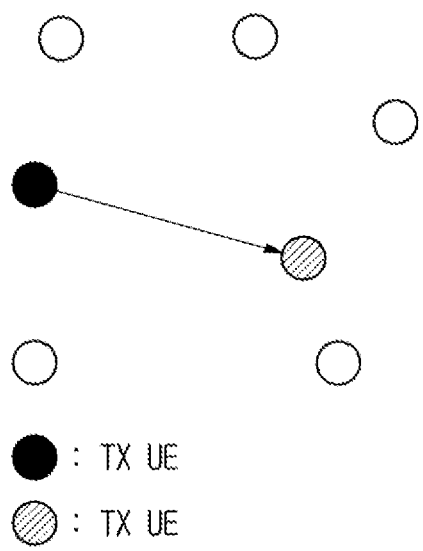
Figure 10C:
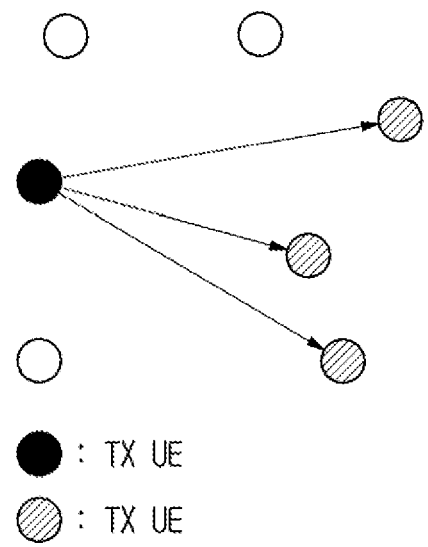

FIGS. 10A to 10C illustrate three cast types applicable to the present disclosure. The embodiment of FIGS. 10A to 10C may be combined with various embodiments of the present disclosure. Specifically, FIG. 10A exemplifies broadcast-type SL communication, FIG. 10B exemplifies unicast type-SL communication, and FIG. 10C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 11:
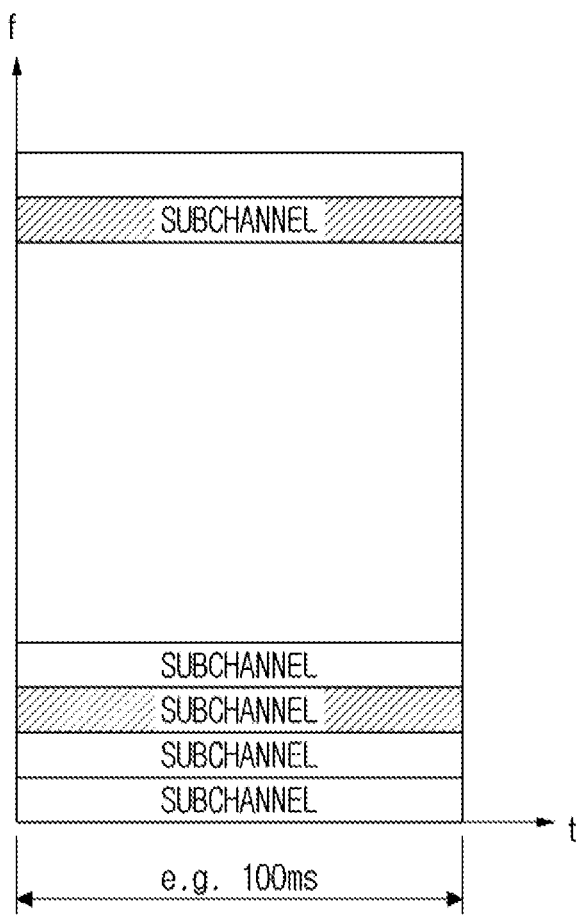
FIG. 11 illustrates a resource unit for channel busy ratio (CBR) measurement, in accordance with an embodiment of the present disclosure.

FIG. 11 illustrates resource units for CBR measurement applicable to the present disclosure. The embodiment of FIG. 11 may be combined with various embodiments of the present disclosure.

Referring to FIG. 11, a CBR may refer to the number of subchannels of which the RSSI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 11, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

An example of SL CBR and SL RSSI is as follows. In the description below, the slot index may be based on a physical slot index.

A SL CBR measured in slot n is defined as the portion of sub-channels in the resource pool whose SL RSSI measured by the UE exceed a (pre-) configured threshold sensed over a CBR measurement window [n−a, n−1]. Herein, a is equal to 100 or 100.24 slots, according to higher layer parameter sl-TimeWindowSizeCBR. The SL CBR is applicable for RRC_IDLE intra-frequency, RRC_IDLE inter-frequency, RRC_CONNECTED intra-frequency, or RRC_CONNECTED inter-frequency A SL RSSI is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. The SL RSSI is applicable for RRC_IDLE intra-frequency, RRC_IDLE inter-frequency, RRC_CONNECTED intra-frequency or RRC_CONNECTED inter-frequency.

An example of an SL (Channel occupancy Ratio) is as follows. The SL CR evaluated at slot n is defined as the total number of sub-channels used for its transmissions in slots [n−a, n−1] and granted in slots [n, n+b] divided by the total number of configured sub-channels in the transmission pool over [n−a, n+b]. The SL CR is applicable for RRC_IDLE intra-frequency, RRC_IDLE inter-frequency, RRC_CONNECTED intra-frequency or RRC_CONNECTED inter-frequency. Herein, a may be a positive integer and b may be 0 or a positive integer. a and b may be determined by UE implementation with a+b+1=1000 or $1000·2^y$ slots, according to higher layer parameter sl-TimeWindowSizeCR, b<(a+b+1)/2, and n+b shall not exceed the last transmission opportunity of the grant for the current transmission. The SL CR is evaluated for each (re)transmission. In evaluating SL CR, the UE shall assume the transmission parameter used at slot n is reused according to the existing grant(s) in slot [n+1, n+b] without packet dropping. The slot index is based on physical slot index. The SL CR can be computed per priority level. A resource is considered granted if it is a member of a selected sidelink grant as defined in TS 38.321.

Positioning

Figure 12:
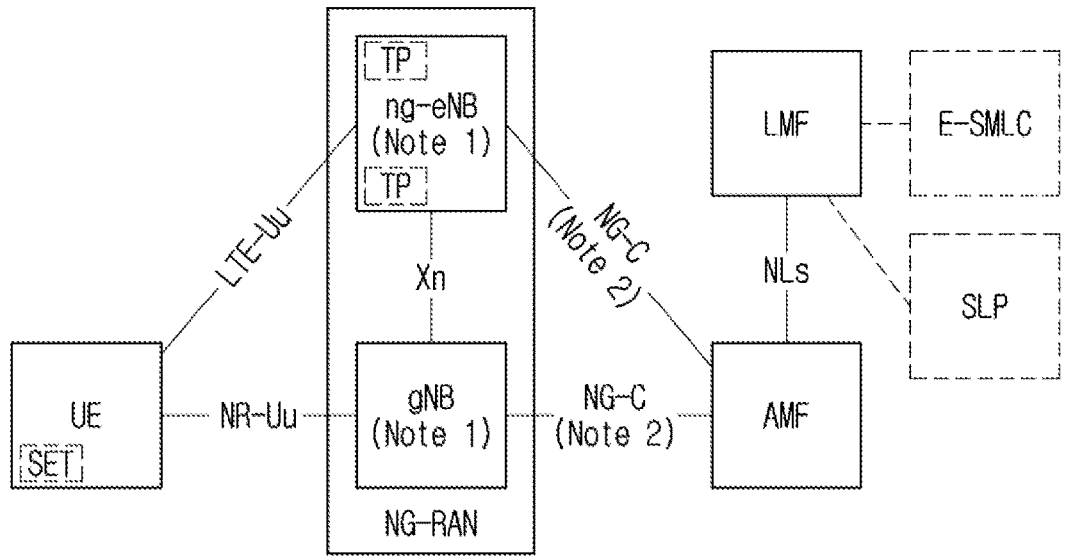
FIG. 12 illustrates an example of an architecture in a 5G system, for positioning a UE which has accessed an NG-RAN or an evolved UMTS terrestrial radio access network (E-UTRAN), in accordance with an embodiment of the present disclosure.

FIG. 12 illustrates an example of an architecture of a 5G system capable of positioning a UE connected to an NG-RAN or an E-UTRAN, in accordance with an embodiment of the present disclosure.

Referring to FIG. 12, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 13:
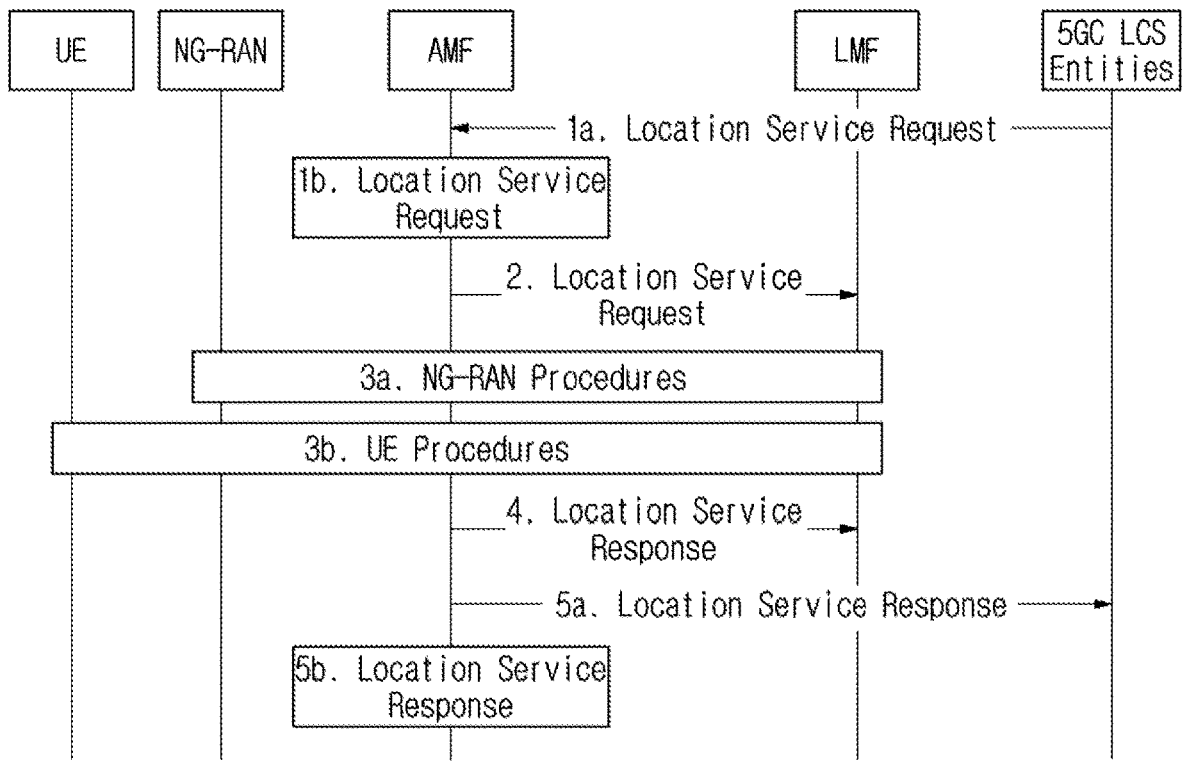
FIG. 13 illustrates an implementation example of a network for positioning a UE, in accordance with an embodiment of the present disclosure.

FIG. 13 illustrates exemplary implementation of a network for positioning a UE, in accordance with an embodiment of the present disclosure.

Upon receipt of a location service request when the UE is in a connection management—IDLE (CM-IDLE) state, the AMF may establish a signaling connection with the UE and request a network trigger service to assign a specific serving gNB or ng-eNB. This operation is not shown in FIG. 13. That is, FIG. 13 may be based on the assumption that the UE is in connected mode. However, the signaling connection may be released by the NG-RAN due to signaling and data deactivation during positioning.

Referring to FIG. 13, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 13 is initiated in step 1a, the AMF may deliver the location service response to the 5GC entity such as the GMLC. When the procedure of FIG. 13 is initiated in step 1b, the AMF may use the location service response to provide the location service related to an emergency call or the like.

Figure 14:
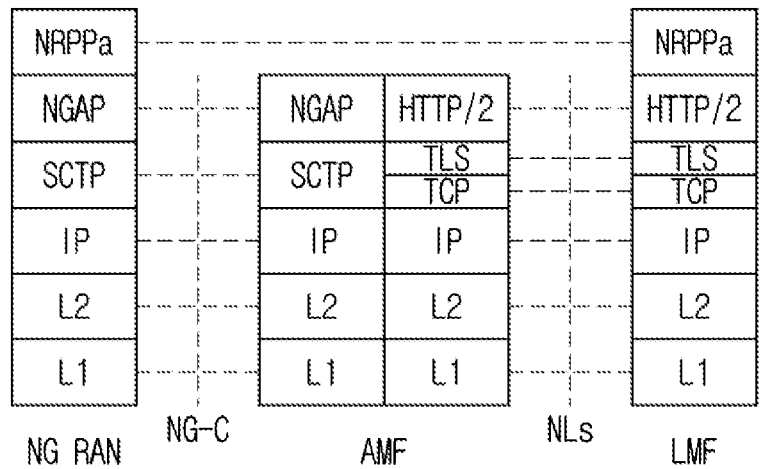
FIG. 14 illustrates exemplary protocol layers used to support LTE positioning protocol (LPP) message transmission between a location management function (LMF) and a UE, in accordance with an embodiment of the present disclosure.

FIG. 14 illustrates exemplary protocol layers used to support LTE positioning protocol (LPP) message transmission between an LMF and a UE, in accordance with an embodiment of the present disclosure.

An LPP PDU may be transmitted in a NAS PDU between the AMF and the UE. Referring to FIG. 14, the LPP may be terminated between a target device (e.g., a UE in the control plane or a SUPL enabled terminal (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE in various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 15:
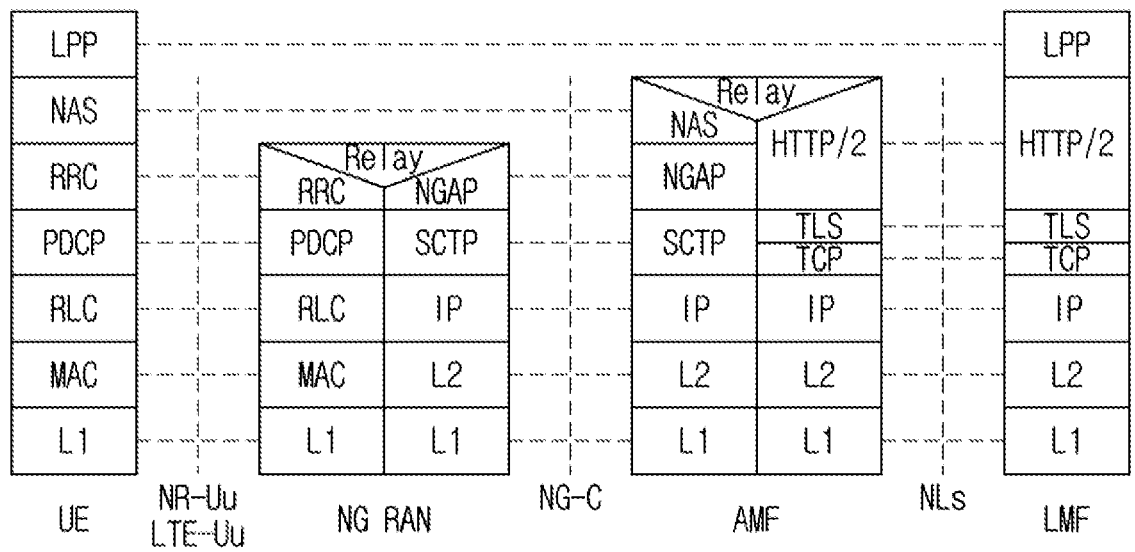
FIG. 15 illustrates exemplary protocol layers used to support NR positioning protocol A (NRPPa) protocol data unit (PDU) transmission between an LMF and an NG-RAN node, in accordance with an embodiment of the present disclosure.

FIG. 15 illustrates exemplary protocol layers used to support NR positioning protocol A (NRPPa) PDU transmission between an LMF and an NG-RAN node, in accordance with an embodiment of the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned in any of the above positioning methods, two or more positioning methods may be used to position the UE.

(1) Observed Time Difference Of Arrival (OTDOA)

Figure 16:
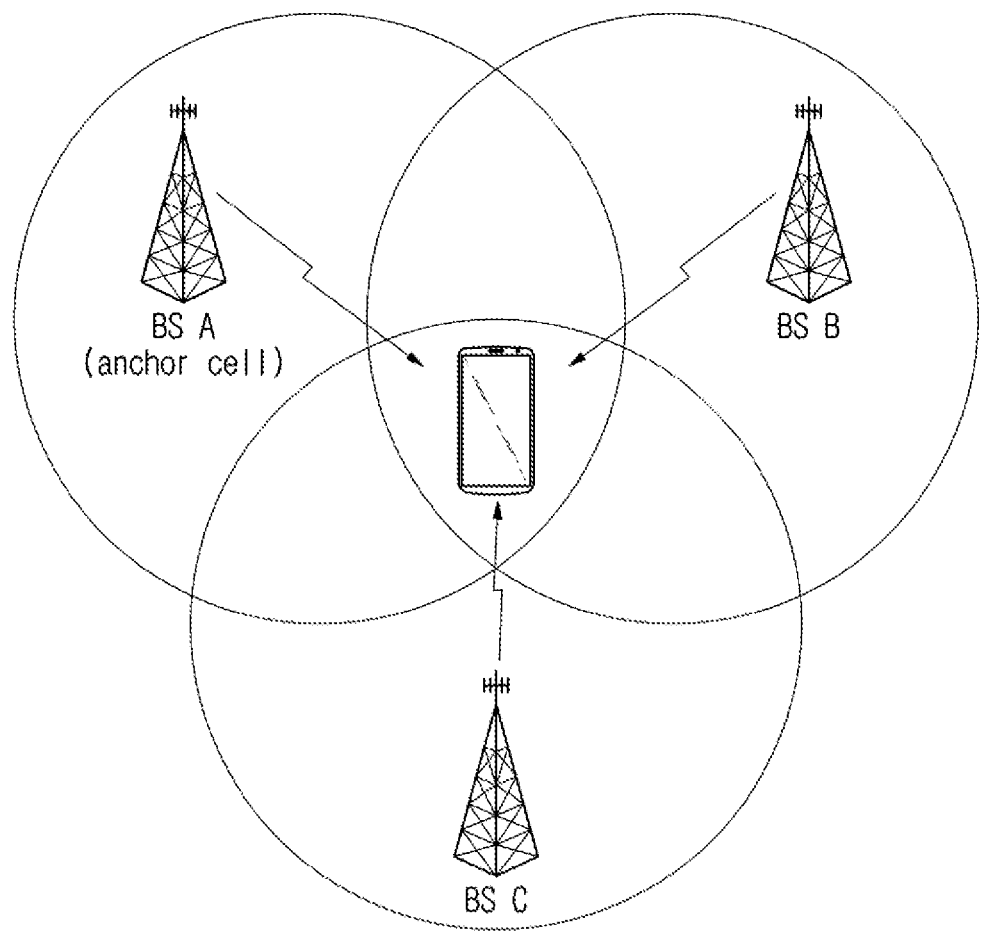
FIG. 16 illustrates an observed time difference of arrival (OTDOA) positioning method, in accordance with an embodiment of the present disclosure.

FIG. 16 is a diagram illustrating an OTDOA positioning method, in accordance with an embodiment of the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

Herein, an RSTD may be defined based on a smallest relative time difference between the boundaries of two subframes received from a reference cell and a measurement cell. That is, the RSTD may be calculated as a relative timing difference for between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_i - x_t)^2 - (y_i - y_t)^2}}{c} - \frac{\sqrt{(x_i - x_i)^2 - (y_i - y_i)^2}}{c} + (T_i - T_i) + (n_i - n_i)$$ [Equation 1]

where c is the speed of light, {xt, yt} is the (unknown) coordinates of the target UE, {xi, yi} is the coordinates of a (known) TP, and {x1, y1} is the coordinates of a reference TP (or another TP). (Ti-T1) is a transmission time offset between the two TPs, which may be referred to as "real time difference" (RTD), and ni and n1 may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH EOM.

E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+ (UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (UL Time Difference of Arrival)

A UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Specific Embodiments of the Present Disclosure

Hereinafter, the present disclosure describes a technique for performing positioning using a beamformed signal in a wireless communication system. Specifically, the present disclosure proposes a technique capable of reducing a time required for positioning by integrating a positioning procedure and a beam management procedure into one procedure.

In vehicle-related applications such as autonomous driving, high-precision positioning is an essential technology element. To this end, transmission of a wideband positioning reference signal (PRS) is required. Due to the lack of spectrum of the existing licensed band, it is necessary to use a mmWave unlicensed band, and, in this case, scheduling and beam management for PRS transmission in a communication link between mm Wave vehicles, that is, in a mmWave V2X sidelink, is essentially required. Accordingly, the present disclosure describes various embodiments capable of efficiently performing PRS scheduling and beam management.

Figure 17:
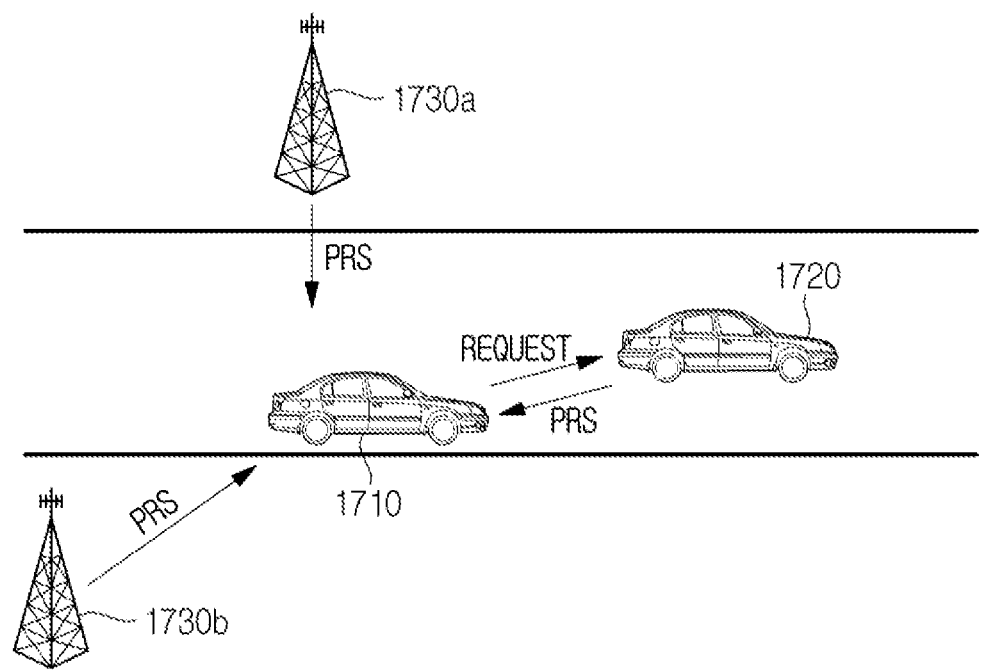
FIG. 17 illustrates the concept of a positioning procedure based on a positioning reference signal (PRS) request in a wireless communication system according to an embodiment of the present disclosure.

FIG. 17 illustrates the concept of a positioning procedure based on a positioning reference signal (PRS) request in a wireless communication system according to an embodiment of the present disclosure.

Referring to FIG. 17, a first vehicle terminal 1710 tries to perform positioning. A second vehicle terminal 1720 and two fixed nodes 1730a and 1730b are present around the first vehicle terminal 1710. Here, each of the fixed nodes 1730a and 1730b may be a road side unit (RSU) or a base station. The fixed nodes 1730a and 1730b may transmit PRSs for positioning of a neighboring device (e.g., the first vehicle terminal 1710). That is, the fixed nodes 1730a and 1730b may periodically transmit the PRSs without a separate request. Each of the fixed nodes 1730a and 1730b may repeatedly transmit PRSs according to a set pattern. Accordingly, the first vehicle terminal 1710 may measure the reception times of the received PRSs and perform direct positioning based on the reception times or transmit the measurement result to an upper node (e.g., an LMF).

In general, in order to perform positioning according to the TDOA or OTDOA technique, more than a certain number of signal sources are required. If there are enough fixed nodes (hereinafter, "fixed PRS sources") that transmit PRSs in the vicinity of the first vehicle terminal 1710 to perform positioning, the first vehicle terminal 1710 may perform positioning using the PRS signals from the neighboring fixed PRS sources. However, when a sufficient number of fixed PRS sources is not present in the vicinity, it may be difficult to perform a positioning operation.

In this case, according to various embodiments, the first vehicle terminal 1710 may request transmission of the PRS from another terminal 1720, for example, the second vehicle terminal 1720. Accordingly, the first vehicle terminal 1710 may further secure a device that provides a PRS (hereinafter, "PRS source") and may perform positioning. Furthermore, even if there are no fixed PRS sources in the vicinity, according to various embodiments, the first vehicle terminal 1710 may utilize a plurality of other terminals including the second vehicle terminal 1720 as PRS sources to perform positioning.

According to the procedure described with reference to FIG. 17, the terminal may request that another terminal should operate as a PRS source, and the other terminal may operate as a PRS source. In this case, the terminals may perform mutual communication using a beamformed signal. In this case, a procedure for matching a transmit beam and a receive beam between terminals needs to be preceded. If the aforementioned procedure and the beam matching procedure are separately performed, time latency until final PRS transmission will increase.

In other words, in order to transmit/receive a PRS in a millimeter wave sidelink system, a procedure for requesting PRS transmission and allocating resources and a procedure for managing a beam are required. When the two procedures are sequentially performed, excessive time latency may occur in a vehicle-to-vehicle communication environment with strict end-to-end latency conditions. Therefore, it is necessary to minimize the time latency until the final PRS transmission by organically combining the PRS scheduling procedure and the beam management procedure.

Accordingly, the present disclosure proposes a method of organically combining the above-described procedure for requesting PRS transmission and allocating resources and a procedure for matching beams between two vehicle terminals in order to exchange PRSs in a millimeter wave sidelink system. For beam matching, beamforming may be applied to messages or signals transmitted by the aforementioned vehicle terminals, and beam-related reports may be included in some messages.

Figure 18:
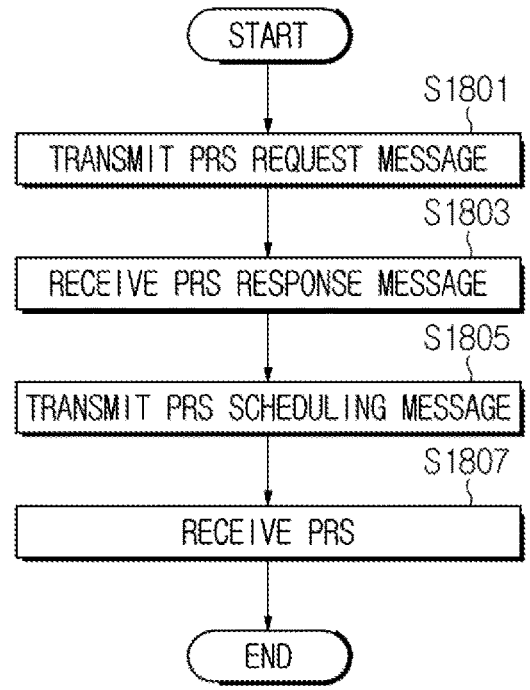
FIG. 18 illustrates an example of a method of operating a terminal for performing positioning in a wireless communication system according to an embodiment of the present disclosure.

FIG. 18 illustrates an example of a method of operating a terminal for performing positioning in a wireless communication system according to an embodiment of the present disclosure. FIG. 18 illustrates a method of operating a terminal (e.g., the first vehicle terminal 1710) for receiving a PRS signal.

Referring to FIG. 18, in step S1801, the terminal transmits a PRS request message. In other words, the terminal transmits a message requesting that a neighboring terminal should operate as a PRS source. The PRS request message includes information indicating that PRS transmission is requested. The PRS request message may be transmitted without specifying a destination terminal. In this case, according to an embodiment, the terminal repeatedly transmits the PRS request message using a plurality of beams. That is, the terminal transmits the PRS request messages using different beams.

In step S1803, the terminal receives a PRS response message. The terminal receives a PRS response message from another terminal that has received the PRS request message. The PRS response message includes identification information of another terminal as a response indicating that the other terminal will transmit the PRS. Also, according to an embodiment, the PRS response message may include information related to selection of at least one beam (e.g., an indication of the selected beam, measurement information, etc.). In this case, information related to selection may be expressed explicitly or implicitly. Although the information related to selection indicates a transmit beam, a receive beam for receiving a signal transmitted from the other terminal may also be confirmed according to channel reciprocity.

In step S1805, the terminal transmits a PRS scheduling message. The scheduling message includes information related to a resource for transmitting the PRS. The PRS scheduling message may be transmitted together with a reference signal, for decoding in another terminal. In this case, according to an embodiment, the terminal transmits the PRS scheduling message through at least one beam selected by another terminal. Furthermore, in order to determine the receive beam of another terminal, the terminal may repeatedly transmit a PRS scheduling message. Through this, before the PRS transmission is performed, a beam pair for PRS transmission of another terminal and PRS reception of the terminal is determined.

In step S1807, the terminal receives the PRS. The terminal may receive the PRS transmitted from another terminal in the resource indicated by the PRS scheduling message. If necessary, the PRS may be received together with positioning assist data. For example, the positioning assist information may include location information (e.g., coordinates, distance, etc.) of another terminal. In this case, according to an embodiment, the terminal receives the PRS using the receive beam confirmed by the information related to selection included in the PRS response message.

Although not shown in FIG. 18, the terminal may perform positioning using the PRS received from another terminal and the PRSs received from at least one other PRS source (e.g., another terminal, RSU, base station, etc.). Specifically, the terminal may calculate a time difference between PRSs received from different PRS sources. The calculated time difference information may be transmitted to an upper node or may be used directly by the terminal for location calculation.

Figure 19:
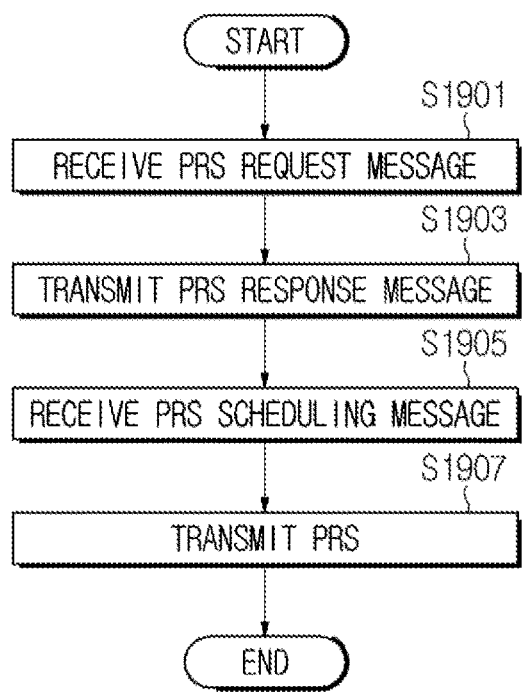
FIG. 19 illustrates an example of a method of operating a terminal assisting positioning in a wireless communication system according to an embodiment of the present disclosure.

FIG. 19 illustrates an example of a method of operating a terminal assisting positioning in a wireless communication system according to an embodiment of the present disclosure. FIG. 19 illustrates a method of operating a terminal (e.g., the second vehicle terminal 1720) for transmitting a PRS signal.

Referring to FIG. 19, in step S1901, the terminal receives a PRS request message. In other words, the terminal receives a message requesting to operate as a PRS source from another terminal. The PRS request message includes information indicating that PRS transmission is requested. Since the terminal may not know the direction of another terminal or a beam direction suitable for communication with another terminal, according to an embodiment, the terminal may receive the signal of the PRS request message using a wide beam. In this case, since another terminal repeatedly transmits the PRS request message through different transmit beams, the terminal may select at least one preferred transmit beam based on whether the PRS request message is received and a measurement result.

In step S1903, the terminal transmits a PRS response message. The terminal transmits a PRS response message to another terminal that has transmitted the PRS request message. The PRS response message includes identification information of the terminal as a response indicating that the terminal will transmit the PRS. Also, according to an embodiment, the PRS response message may include information related to selection of at least one beam (e.g., an indication of the selected beam, measurement information, etc.). In this case, information related to selection may be expressed explicitly or implicitly.

In step S1905, the terminal receives a PRS scheduling message. The scheduling message includes information related to a resource for transmitting the PRS. The PRS scheduling message may be received together with a reference signal to enable channel estimation for decoding. At this time, according to an embodiment, another terminal repeatedly transmits a PRS scheduling message. Accordingly, the terminal may attempt to receive the PRS scheduling message using a plurality of receive beams, and may select at least one preferred receive beam based on whether the PRS scheduling message is received and a measurement result. Through this, before PRS transmission is performed, determination of a beam pair for PRS transmission of the terminal and PRS reception of another terminal is completed.

In step S1907, the terminal transmits the PRS. The terminal may transmit the PRS received from another terminal in the resource indicated by the PRS scheduling message. If necessary, the terminal may transmit the PRS and positioning assist data together. For example, the positioning assist information may include location information (e.g., coordinates, distance, etc.) of the terminal. In this case, according to an embodiment, the terminal transmits the PRS using a transmit beam corresponding to a receive beam selected based on the PRS scheduling message.

As in the embodiments described with reference to FIGS. 18 and 19, PRS source securing and beam matching may be performed through one procedure. Through this, PRS transmission and reception using a beamformed signal between the first terminal requesting PRS transmission and the second terminal transmitting the PRS may be performed quickly. Specifically, the second terminal selects the transmit beam of the first terminal based on the PRS request message and feeds back the selected beam through the PRS response message, so that the first terminal may determine the beam to be used for PRS reception. In addition, since the first terminal repeatedly transmits the PRS scheduling message using the same beam, the second terminal may obtain information related to a resource for PRS transmission, measure a receive beam, and determine a beam to be used for PRS transmission.

In the above procedure, the transmitted messages may include information indicating the purpose or type of each message, and information on resources for transmitting subsequent messages. For example, the PRS request message includes information indicating that PRS transmission is requested and information on resources (e.g., resource pool) for transmitting a PRS response message, and the included information is expressed explicitly or implicitly.

Similarly, information on selection of the beam included in the PRS response message may be expressed explicitly or implicitly. For example, a beam index may be included in the PRS response message. As another example, by allocating unique response resources to each beam, an effect of implicitly performing beam reporting when transmitting a PRS response message may be obtained. In addition, by allocating different requested transmission resources for each service, an effect of signaling a service may be obtained.

Figure 20:
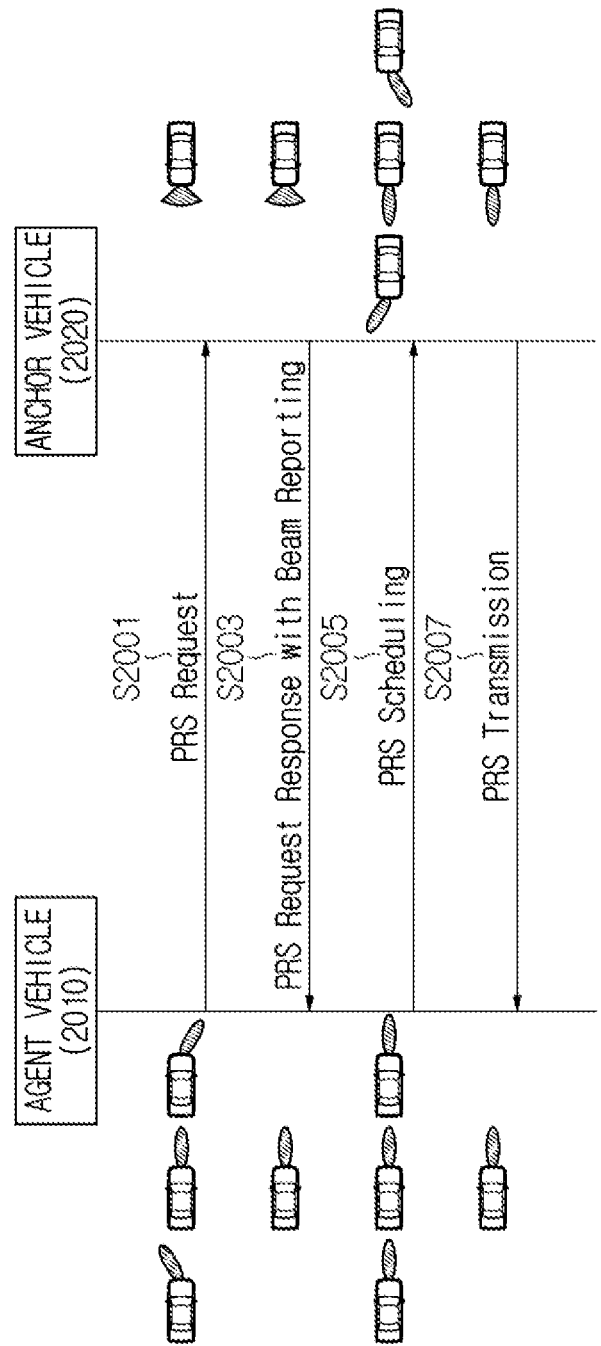
FIG. 20 illustrates an example of a procedure for transmitting a PRS based on a request in a wireless communication system according to an embodiment of the present disclosure.

Hereinafter, a PRS request procedure according to a more specific embodiment will be described with reference to FIG. 20. In FIG. 20, a terminal requesting a PRS is referred to as an "agent vehicle", and a terminal transmitting the PRS is referred to as an "anchor vehicle".

FIG. 20 illustrates an example of a procedure for transmitting a PRS based on a request in a wireless communication system according to an embodiment of the present disclosure. FIG. 20 illustrates signal exchange between an agent vehicle 2010 and an anchor vehicle 2020. In addition, FIG. 20 illustrates transmit beamforming or receive beamforming of each of the agent vehicle 2010 and the anchor vehicle 202 during transmission and reception of each message.

Referring to FIG. 20, in step S2001, the agent vehicle 2010 may transmit a PRS request message, and the anchor vehicle 2020 may receive a PRS request message. The agent vehicle 2010 may request PRS transmission from a neighboring vehicle for positioning. Here, the PRS request message includes information indicating that PRS transmission is requested. The request for PRS transmission may be expressed by an explicit indicator (e.g., a service ID corresponding to the PRS request) or may be expressed implicitly. For example, the PRS request message may be transmitted through a resource pool allocated for a positioning service (hereinafter, "PRS request resource pool") to report the PRS transmission request. When the PRS request resource pool is used, the anchor vehicle 3020 may receive a PRS request message by monitoring the PRS request resource pool.

Figure 21:
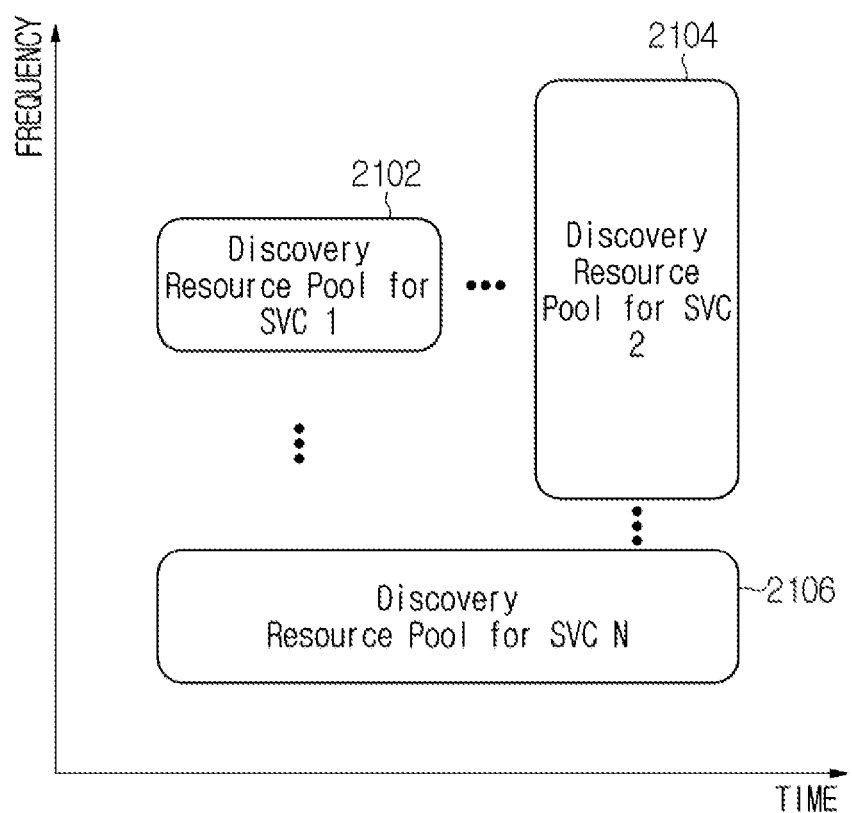
FIG. 21 illustrates an example of resource pools allocated for each service in a wireless communication system according to an embodiment of the present disclosure.

According to an embodiment, the PRS request message may be in the form of a discovery signal, and the PRS request may be signaled through a service ID in the discovery signal. Alternatively, different individual discovery resource pools may be allocated according to the requested service. For example, the discovery resource pool may be allocated as shown in FIG. 21. Referring to FIG. 21, a plurality of resource pools 2102 to 2106 may be allocated to different time-frequency domains. If the resource pool 2102 of the plurality of resource pools 2102 to 2106 is allocated for a positioning service, the PRS request message is transmitted through the resource pool 2102.

In this case, the anchor vehicle 2020 interested in the positioning service monitors only the discovery resource pool allocated for the positioning service. The PRS request message may be in the form of a beamformed signal, and may be repeatedly transmitted using different beams. The PRS request message may include the ID of the agent vehicle 2010 and information related to at least one resource for enabling another vehicle receiving it to send a response. PRS requests transmitted using different beams may include different PRS request response resource information.

In step S2003, the anchor vehicle 2020 transmits a PRS request response message. When transmitting the PRS after receiving the PRS request message, the anchor vehicle 2020 may transmit a PRS request response message. The PRS request response message may include IDs of the agent vehicle 2010 and the anchor vehicle 2020, and may include information on at least one resource for enabling the agent vehicle 2010 to transmit the PRS scheduling message. At this time, the agent vehicle 2010 may not know which receive beam may be used to receive the signal transmitted from the anchor vehicle 2020. Accordingly, the agent vehicle 2010 attempts to receive the PRS request response message using a plurality of receive beams, and receives the PRS request response message using at least one of the plurality of receive beams.

When PRS request messages are received using multiple beams, the PRS request response message may include information related to beam(s) preferred by the anchor vehicle 2020. The information related to the preferred beam(s) may include a beam index, a reference signal received power (RSRP) of the beam, and the like. Alternatively, when the anchor vehicle 2020 selects a PRS request response resource specified by a PRS request message associated with a specific beam, the agent vehicle 2010 receives a PRS request response message using the resource, thereby knowing the transmit beam information preferred by the anchor vehicle 2020.

Figure 22:
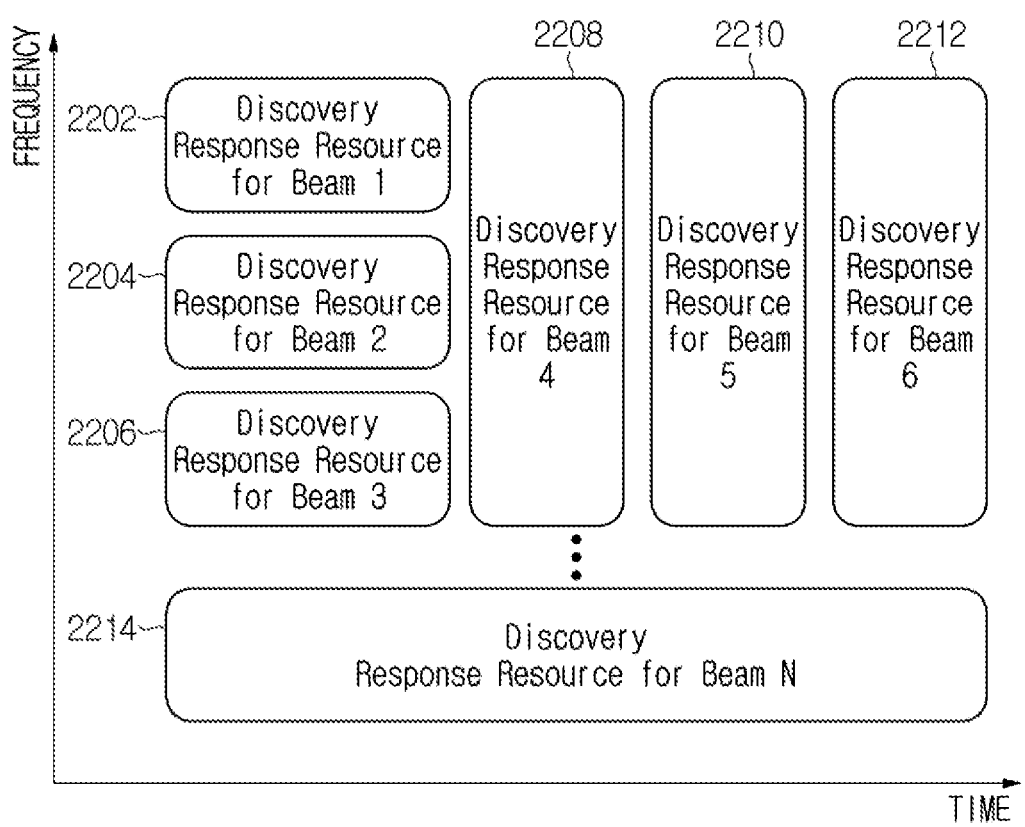
FIG. 22 illustrates an example of resource pools allocated for each beam in a wireless communication system according to an embodiment of the present disclosure.

For example, resource pools may be allocated as shown in FIG. 22. Referring to FIG. 22, a plurality of resource pools 2202 to 2214 corresponding to different beams may be allocated. When the anchor vehicle 2020 selects the PRS request message transmitted through beam-4, the anchor vehicle 2030 transmits a PRS request response message through the resource pool 2208 corresponding to beam-4. When the anchor vehicle 2020 receives the PRS request, it is possible to measure the RSRP from the received signal and to determine whether to transmit the PRS request response according to whether the measured RSRP value exceeds a specific threshold. In this case, the threshold may be a value set by a network or preset in the terminal.

In step S2005, the agent vehicle 2010, which has received the PRS request response message, may transmit a PRS scheduling message. The PRS scheduling message may include information related to at least one resource for enabling the anchor vehicle 2020 to transmit the PRS. The PRS scheduling information may be beamformed, and, for the PRS scheduling message, the beam may be a beam related to beam information included in the PRS request response message or a beam related to a resource through which the PRS request response is received. The PRS scheduling message may be multiplexed together with a reference signal, and the reference signal may be used to decode the PRS scheduling message. In addition, the PRS scheduling message may be repeatedly transmitted using the same beam together with the reference signal. In this case, the PRS scheduling message or the reference signal may be used to select an optimal receive beam in the anchor vehicle 2020. The receive beam selected using the reference signal may be used as a transmit beam for enabling the anchor vehicle 2020 to transmit the PRS according to the principle of channel reciprocity.

In step S2007, the anchor vehicle 2020 transmits a PRS. The anchor vehicle 2020, which has received the PRS scheduling message, may obtain resource information for transmitting the PRS. In addition, when receiving a plurality of PRS scheduling messages, the anchor vehicle 2020 may receive PRS scheduling messages using different beams, and may select at least one receive beam through measurement such as RSRP. The selected receive beam(s) may be a beam suitable for transmission according to the principle of transmission/reception channel reciprocity, and may be used for PRS transmission. The PRS may be repeatedly transmitted, and, in this case, may be transmitted using the same transmit beam or different transmit beams. The PRS may be multiplexed with the positioning assist data, and the PRS may be used to decode the positioning assist data. The positioning assist data may include coordinates of the anchor vehicle 2020 or information (e.g., coordinates, distance, etc.) of a fixed reference that the anchor vehicle 2020 has.

In the embodiment described with reference to FIG. 20, the agent vehicle 2010 may repeatedly transmit the PRS scheduling message to determine the receive beam of the anchor vehicle 2020. In this case, the number of repeated transmissions is preferably equal to the number of candidate receive beams available in the anchor vehicle 2020. According to another embodiment, if the anchor vehicle 2020 has the capability to simultaneously form a plurality of receive beams, the PRS scheduling message may be transmitted only the number of times (e.g., once) less than the number of candidate receive beams available in the anchor vehicle 2020. To this end, the agent vehicle 2010 needs to obtain information related to the beamforming capability of the anchor vehicle 2020. Therefore, according to another embodiment, before or during the procedure of FIG. 20 or through one of the messages described in FIG. 20, the agent vehicle 2010 may obtain information on the beamforming capability of the anchor vehicle 2020. For example, the information on the beamforming capability may indicate the number of transmissions of a signal (e.g., a PRS scheduling message) necessary for the anchor vehicle 2020 to determine a receive beam.

Also, in the procedure described with reference to FIG. 20, according to an embodiment, the PRS request message and the PRS request response message may be transmitted through the resource pool. In this case, information on the resource pool may be provided through a procedure separate from the procedure illustrated in FIG. 20. For example, information on the resource pool may be included in system information transmitted by the base station or may be predefined.

As described above, the present disclosure proposes a new procedure in which a PRS request procedure and a beam management procedure are organically combined. Using the proposed procedure, the PRS request procedure and the beam management procedure may be performed in parallel, thereby reducing the time latency until the final PRS transmission.

System and Various Devices to which Embodiments of the Present Disclosure are Applicable Various embodiments of the present disclosure may be combined with each other.

Hereinafter, a device to which various embodiments of the present disclosure may be applied will be described. Although not limited thereto, various descriptions, functions, procedures, proposals, methods, and/or operation flowcharts disclosed in this document may be applied to various fields requiring wireless communication/connection (e.g., 5G) between devices.

Hereinafter, it will be described in more detail with reference to the drawings. In the following drawings/description, the same reference numerals may represent the same or corresponding hardware blocks, software blocks, or functional blocks, unless otherwise indicated.

Figure 23:
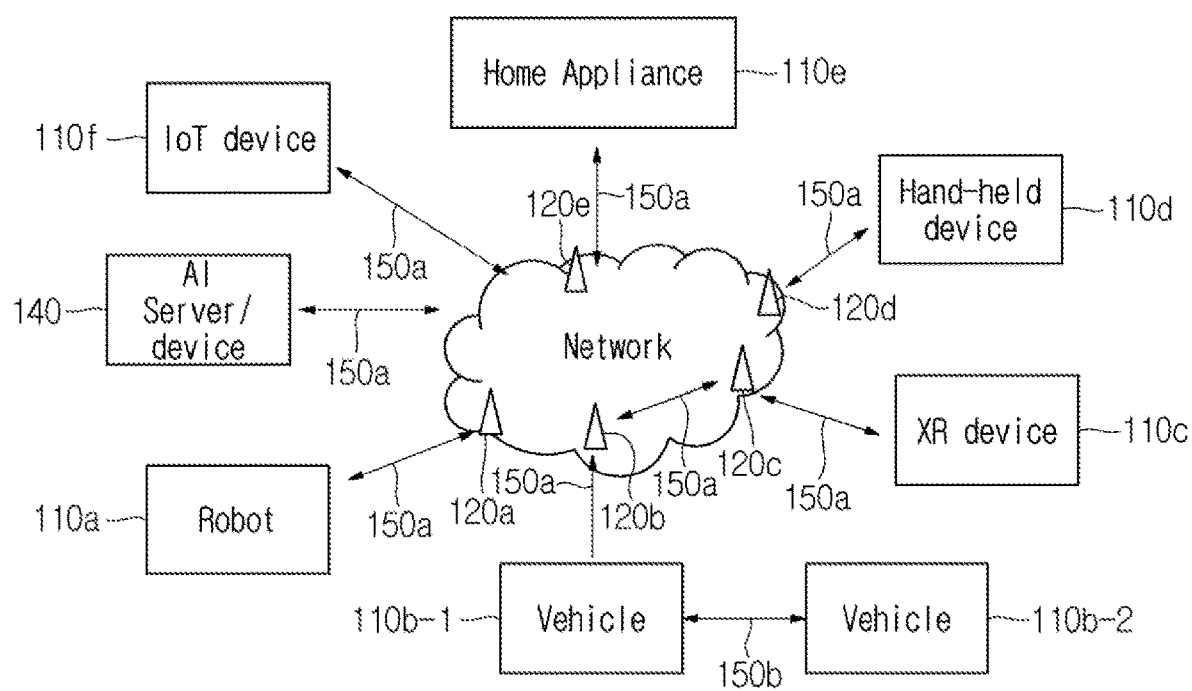
FIG. 23 illustrates a communication system, in accordance with an embodiment of the present disclosure.

FIG. 23 illustrates a communication system, in accordance with an embodiment of the present disclosure. The embodiment of FIG. 23 may be combined with various embodiments of the present disclosure.

Referring to FIG. 23, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120a to 120e network may be implemented by a wireless device, and a specific wireless device 120a may operate as a base station/network node for another wireless device.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network through the base station 120. AI technology is applicable to the wireless devices 100a to 100f, and the wireless devices 100a to 100f may be connected to the AI server 100g through the network. The network may be configured using a 3G network, a 4G (e.g., LTE) network or a 5G (e.g., NR) network, etc. The wireless devices 100a to 100f may communicate with each other through the base stations 120a to 120e or perform direct communication (e.g., sidelink communication) without through the base stations 120a to 120e. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base stations 120a to 120e and the base stations 120a to 120e/the base stations 120a to 120e. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 24:
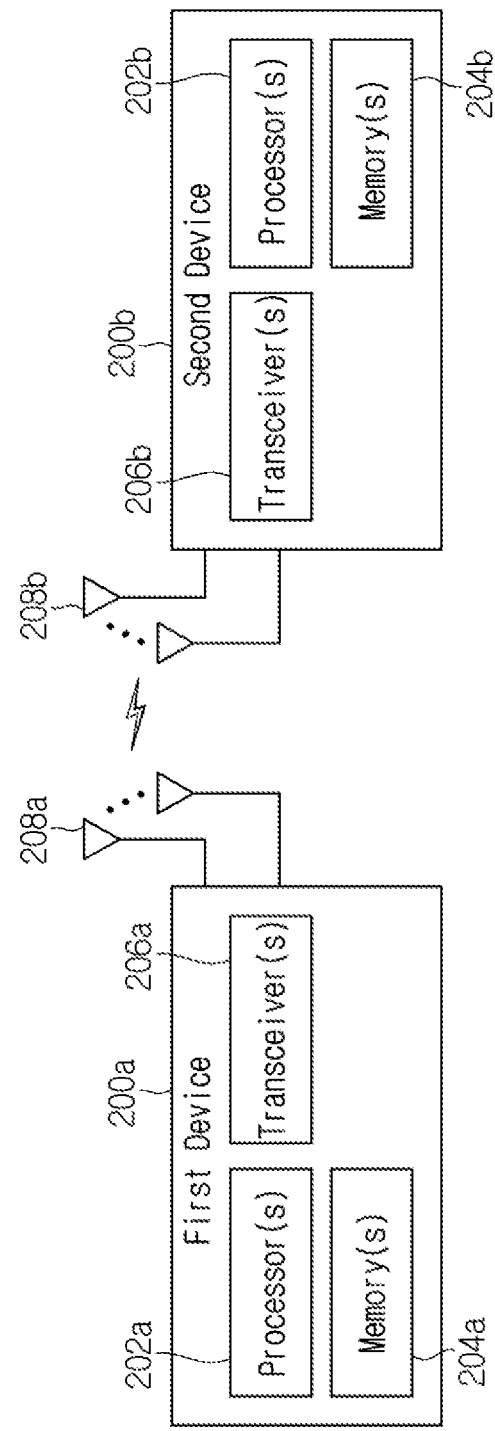
FIG. 24 illustrates wireless devices, in accordance with an embodiment of the present disclosure.

FIG. 24 illustrates wireless devices, in accordance with an embodiment of the present disclosure. The embodiment of FIG. 24 may be combined with various embodiments of the present disclosure.

Referring to FIG. 24, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 23.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may perform wireless communications with the first wireless device 200a and may include one or more processors 202b and one or more memories 204b and may further include one or more transceivers 206b and/or one or more antennas 208b. The functions of the one or more processors 202b, one or more memories 204b, one or more transceivers 206b, and/or one or more antennas 208b are similar to those of one or more processors 202a, one or more memories 204a, one or more transceivers 206a and/or one or more antennas 208a of the first wireless device 200a.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs), one or more service data unit (SDU), messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. In addition, one or more transceivers 206a and 206b may be coupled with one or more antennas 208a and 208b, and may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 25:
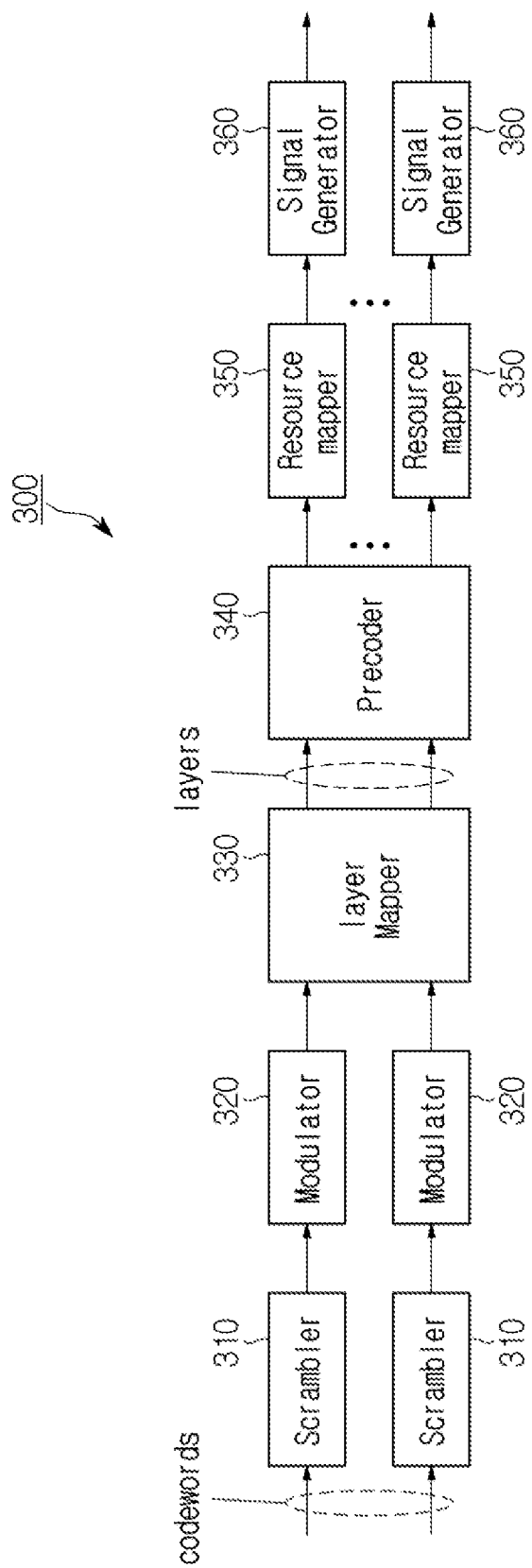
FIG. 25 illustrates a signal process circuit for a transmission signal, in accordance with an embodiment of the present disclosure.

FIG. 25 illustrates a signal process circuit for a transmission signal, in accordance with an embodiment of the present disclosure. The embodiment of FIG. 25 may be combined with various embodiments of the present disclosure.

Referring to FIG. 25, a signal processing circuit 300 may include scramblers 310, modulators 320, a layer mapper 330, a precoder 340, resource mappers 350, and signal generators 360. For example, an operation/function of FIG. 25 may be performed by the processors 202a and 202b and/or the transceivers 36 and 206 of FIG. 24. Hardware elements of FIG. 25 may be implemented by the processors 202a and 202b and/or the transceivers 36 and 206 of FIG. 24. For example, blocks 310 to 360 may be implemented by the processors 202a and 202b of FIG. 24. Alternatively, the blocks 310 to 350 may be implemented by the processors 202a and 202b of FIG. 24 and the block 360 may be implemented by the transceivers 36 and 206 of FIG. 24, and it is not limited to the above-described embodiment. Codewords may be converted into radio signals via the signal processing circuit 300 of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 25. For example, the wireless devices (e.g., 200a and 200b of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 26:
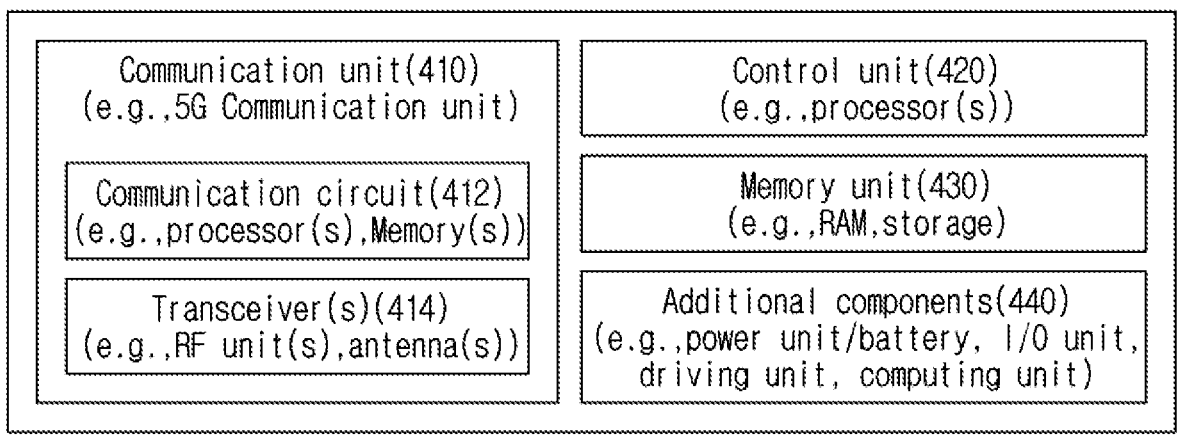
FIG. 26 illustrates a wireless device, in accordance with an embodiment of the present disclosure.

FIG. 26 illustrates a wireless device, in accordance with an embodiment of the present disclosure. The embodiment of FIG. 26 may be combined with various embodiments of the present disclosure.

Referring to FIG. 26, a wireless device 300 may correspond to the wireless devices 200a and 200b of FIG. 24 and include various elements, components, units/portions and/or modules. For example, the wireless device 300 may include a communication unit 310, a control unit (controller) 320, a memory unit (memory) 330 and additional components 340.

The communication unit 410 may include a communication circuit 412 and a transceiver(s) 414. The communication unit 410 may transmit and receive signals (e.g., data, control signals, etc.) to and from other wireless devices or base stations. For example, the communication circuit 412 may include one or more processors 202a and 202b and/or one or more memories 204a and 204b of FIG. 24. For example, the transceiver(s) 414 may include one or more transceivers 206a and 206b and/or one or more antennas 208a and 208b of FIG. 42.

The control unit 420 may be composed of at least one processor set. For example, the control unit 420 may be composed of a set of a communication control processor, an application processor, an electronic control unit (ECU), a graphic processing processor, a memory control processor, etc. The control unit 420 may be electrically coupled with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The memory unit 430 may be composed of a random access memory (RAM), a dynamic RAM (DRAM), a read only memory (ROM), a flash memory, a volatile memory, a non-volatile memory and/or a combination thereof. The memory unit 430 may store data/parameters/programs/codes/commands necessary to derive the wireless device 400. In addition, the memory unit 430 may store input/output data/information, etc.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 41, 100a), the vehicles (FIGS. 41, 100b-1 and 100b-2), the XR device (FIG. 41, 100c), the hand-held device (FIG. 41, 100d), the home appliance (FIG. 41, 100e), the IoT device (FIG. 41, 100f), a digital broadcast terminal, a hologram apparatus, a public safety apparatus, an MTC apparatus, a medical apparatus, a Fintech device (financial device), a security device, a climate/environment device, an AI server/device (FIG. 41, 140), the base station (FIG. 41, 120), a network node, etc. The wireless device may be movable or may be used at a fixed place according to use example/service.

Figure 27:
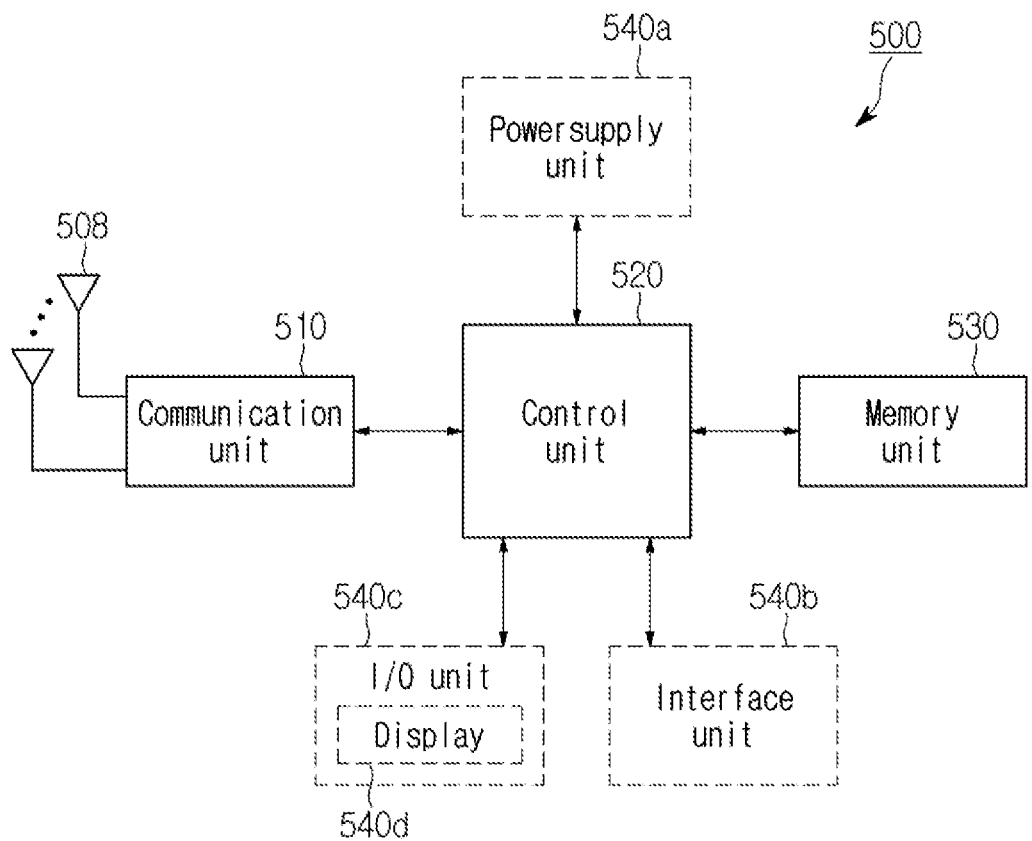
FIG. 27 illustrates a hand-held device, in accordance with an embodiment of the present disclosure.

FIG. 27 illustrates a hand-held device, in accordance with an embodiment of the present disclosure. FIG. 27 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 27 may be combined with various embodiments of the present disclosure.

Referring to FIG. 27, the hand-held device 500 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/440a to 540c may correspond to the blocks 310 to 330/340 of FIG. 26, respectively, and duplicate descriptions are omitted.

The communication unit 510 may transmit and receive signals and the control unit 520 may control the hand-held device 500, and the memory unit 530 may store data and so on. The power supply unit 540a may supply power to the hand-held device 500 and include a wired/wireless charging circuit, a battery, etc. The interface unit 540b may support connection between the hand-held device 500 and another external device. The interface unit 540*b* may include various ports (e.g., an audio input/output port and a video input/output port) for connection with the external device. The input/output unit 540*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540*c* in various forms (e.g., text, voice, image, video and haptic).

Figure 28:
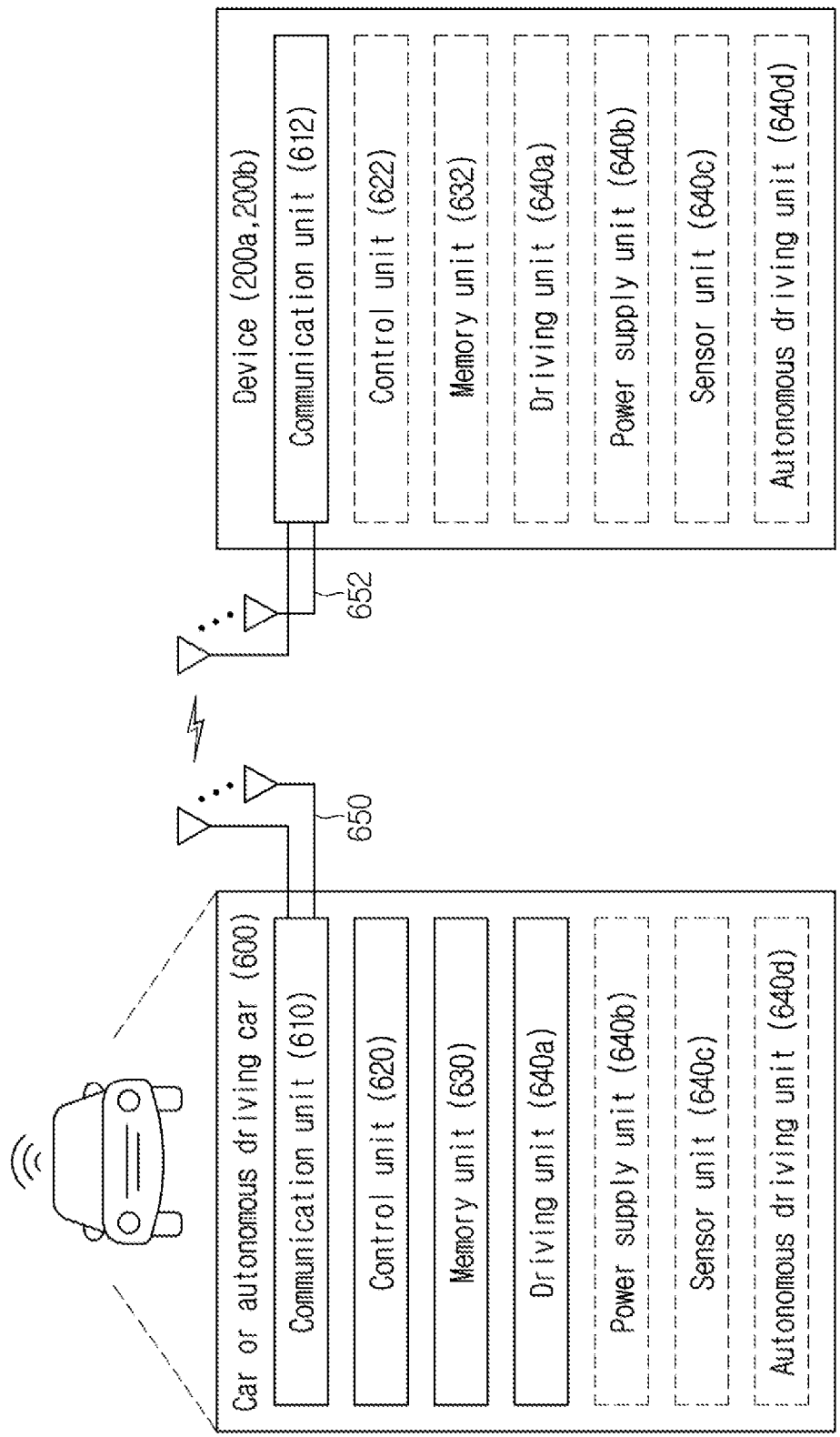
FIG. 28 illustrates a car or an autonomous vehicle, in accordance with an embodiment of the present disclosure.

FIG. 28 illustrates a car or an autonomous vehicle, in accordance with an embodiment of the present disclosure. FIG. 28 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 28 may be combined with various embodiments of the present disclosure Referring to FIG. 28, the car or autonomous driving car 600 may include an antenna unit (antenna) 608, a communication unit (transceiver) 610, a control unit (controller) 620, a driving unit 640*a*, a power supply unit (power supply) 640*b*, a sensor unit 640*c*, and an autonomous driving unit 640*d*. The antenna unit 650 may be configured as part of the communication unit 610. The blocks 610/630/640*a* to 640*d* correspond to the blocks 510/530/540 of FIG. 27, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640*a* may drive the car or autonomous driving car 600 on the ground. The driving unit 640*a* may include an engine, a motor, a power train, wheels, a brake, a steering device, etc. The power supply unit 640*b* may supply power to the car or autonomous driving car 600, and include a wired/wireless charging circuit, a battery, etc. The sensor unit 640*c* may obtain a vehicle state, surrounding environment information, user information, etc. The sensor unit 640*c* may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640*d* may generate an autonomous driving route and a driving plan based on the acquired data. The control unit 620 may control the driving unit 640*a* (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640*c* may acquire a vehicle state and surrounding environment information. The autonomous driving unit 640*d* may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

Industrial Availability

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method of operating a first terminal in a wireless communication system, the method comprising:
   transmitting first messages requesting to transmit a positioning reference signal (PRS);
   receiving a second message related to the PRS;
   transmitting a third message including scheduling information for transmitting the PRS using at least one transmit beam, indicated by the second message, among the plurality of transmit beams;
   receiving PRSs;
   measuring timing of the received PRSs; and
   performing an operation for positioning based on the timings,
   wherein the first message is transmitted by using a plurality of transmit beams, and
   wherein at least one PRS of the PRSs is transmitted at a second terminal based on the scheduling information in the third message.

2. The method of claim 1, wherein the first messages include information indicating that transmission of the PRS is requested or is transmitted through a resource pool corresponding to transmission of the PRS.

3. The method of claim 1, wherein the first messages include information related to a resource for transmitting the second message.

4. The method of claim 3, wherein the information related to the resource is differently set according to a transmit beam used to transmit the first messages.

5. The method of claim 1, wherein the second message includes information indicating the at least one transmit beam or is transmitted through a resource pool corresponding to the at least one transmit beam.

6. The method of claim 1, wherein the second message includes information related to a resource for transmitting the third message.

7. The method of claim 1, wherein the third message is repeatedly transmitted using a transmit beam indicated by the second message.

8. The method of claim 1, wherein the PRS is received using a receive beam corresponding to a transmit beam indicated by the second message.

9. The method of claim 1, further comprising:
   receiving location information of the second terminal or location information of a fixed reference that the second terminal has.

10. A first terminal in a wireless communication system, the first terminal comprising:
    a transceiver; and
    a processor coupled to the transceiver and configured to:
    transmit first messages requesting to transmit a positioning reference signal (PRS);
    receive a second message related to the PRS;
    transmit a third message including scheduling information for transmitting the PRS using at least one transmit beam, indicated by the second message, among the plurality of transmit beams; and
    receive PRSs;
    measuring timing of the received PRSs; and
    performing an operation for positioning based on the timings,
    wherein the first message is transmitted by using a plurality of transmit beams, and
    wherein at least one PRS of the PRSs is transmitted at a second terminal based on the scheduling information in the third message.

11. The first terminal of claim 10, wherein the first messages include information indicating that transmission of the PRS is requested or is transmitted through a resource pool corresponding to transmission of the PRS.

12. The first terminal of claim 10, wherein the first messages include information related to a resource for transmitting the second message.

13. The first terminal of claim 12, wherein the information related to the resource is differently set according to a transmit beam used to transmit the first messages.

14. The first terminal of claim 10, wherein the second message includes information indicating the at least one transmit beam or is transmitted through a resource pool corresponding to the at least one transmit beam.

15. The first terminal of claim 10, wherein the second message includes information related to a resource for transmitting the third message.

16. The first terminal of claim 10, wherein the third message is repeatedly transmitted using a transmit beam indicated by the second message.

17. The first terminal of claim 10, wherein the PRS is received using a receive beam corresponding to a transmit beam indicated by the second message.

18. The first terminal of claim 10, further comprising:
    receiving location information of the second terminal or location information of a fixed reference that the second terminal has.

19. A device comprising at least one memory and at least one processor functionally connected to the at least one memory, wherein the at least one processor controls the device to:
    transmit first messages requesting to transmit a positioning reference signal (PRS);
    receive a second message related to the PRS;
    transmit a third message including scheduling information for transmitting the PRS using at least one transmit beam, indicated by the second message, among the plurality of transmit beams; and
    receive PRSs;
    measuring timing of the received PRSs; and
    performing an operation for positioning based on the timings,
    wherein the first message is transmitted by using a plurality of transmit beams, and
    wherein at least one PRS of the PRSs is transmitted at a terminal based on the scheduling information in the third message.

* * * * *